(12) United States Patent
Jhu et al.

(10) Patent No.: US 11,272,197 B2
(45) Date of Patent: Mar. 8, 2022

(54) DEVICE AND METHOD FOR CODING VIDEO DATA

(71) Applicant: FG Innovation Company Limited, Tuen Mun (HK)

(72) Inventors: Hong-Jheng Jhu, Hsinchu (TW); Yao-Jen Chang, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 49 days.

(21) Appl. No.: 16/552,039

(22) Filed: Aug. 27, 2019

(65) Prior Publication Data

US 2020/0077106 A1 Mar. 5, 2020

Related U.S. Application Data

(60) Provisional application No. 62/723,880, filed on Aug. 28, 2018.

(51) Int. Cl.
| | |
|---|---|
| *H04N 19/44* | (2014.01) |
| *H04N 19/105* | (2014.01) |
| *H04N 19/176* | (2014.01) |
| *H04N 19/46* | (2014.01) |
| *H04N 19/139* | (2014.01) |

(52) U.S. Cl.
CPC .......... *H04N 19/44* (2014.11); *H04N 19/105* (2014.11); *H04N 19/139* (2014.11); *H04N 19/176* (2014.11); *H04N 19/46* (2014.11)

(58) Field of Classification Search
CPC .. H04N 19/105; H04N 19/139; H04N 19/176; H04N 19/44; H04N 19/46
See application file for complete search history.

(56) References Cited

U.S. PATENT DOCUMENTS

| | | | |
|---|---|---|---|
| 2014/0176674 A1* | 6/2014 | Kang | H04N 19/513 348/43 |
| 2015/0146103 A1 | 5/2015 | Koo et al. | |
| 2021/0076062 A1* | 3/2021 | Jang | H04N 19/51 |

FOREIGN PATENT DOCUMENTS

| | | |
|---|---|---|
| CN | 1750656 A | 3/2006 |
| CN | 105791859 A | 7/2016 |
| CN | 107925759 A | 4/2018 |
| CN | 108141604 A | 6/2018 |
| WO | 2018066988 A1 | 4/2018 |

* cited by examiner

*Primary Examiner* — Kathleen V Nguyen
(74) *Attorney, Agent, or Firm* — ScienBiziP, P.C.

(57) ABSTRACT

A method of decoding a bitstream by an electronic device is provided. A block unit is determined from an image frame according to the bitstream. One of a plurality of candidate groups is selected based on a set flag in the bitstream. A plurality of merge mode with motion vector difference (MMVD) indications of the block unit is determined according to the bitstream. A plurality of MMVD prediction parameters of the block unit is determined based on the plurality of MMVD indications and the selected candidate group. The block unit is reconstructed based on the plurality of MMVD prediction parameters.

8 Claims, 8 Drawing Sheets

DEVICE AND METHOD FOR CODING VIDEO DATA

CROSS-REFERENCE TO RELATED APPLICATION(S)

The present application claims the benefit of and priority to a provisional U.S. Patent Application Ser. No. 62/723,880, filed on Aug. 28, 2018, entitled "Candidate Sets for Ultimate Motion Vector Expression", (hereinafter referred to as "US74791 application"). The disclosure of the US74791 application is hereby incorporated fully by reference into the present application.

FIELD

The present disclosure generally relates to video coding, and more particularly, to techniques for predicting a block unit in an image frame based on a plurality of candidate parameters in a plurality of candidate groups.

BACKGROUND

Inter prediction is a coding tool for video coding. In a conventional video coding method, an encoder and a decoder use previously reconstructed pixels in a reference frame different from an image frame of a coding block to generate reference pixels and predictors for predicting or reconstructing a coding block.

The previous reconstructed pixels may be determined from a plurality of candidate parameters. When there is a high number of candidate parameters, the high number of bits in some of the candidate parameters may render the image data compression inefficient. Thus, the encoding (and/or decoding) device may need a prediction method for predicting the coding block in the image frame based on the candidate parameters distributed in a plurality of candidate groups.

SUMMARY

The present disclosure is directed to a device and method for reconstructing a block unit in an image frame based on a plurality of candidate parameters in a plurality of candidate groups.

In a first aspect of the present application, a method for decoding a bitstream by an electronic device is provided. The method comprises determining a block unit from an image frame according to the bitstream; selecting, based on a set flag, one of a plurality of candidate groups; determining a plurality of merge mode with motion vector difference (MMVD) indications of the block unit according to the bitstream; selecting a plurality of MMVD prediction parameters of the block unit based on the plurality of MMVD indications and the selected candidate group; and reconstructing the block unit based on the plurality of MMVD prediction parameters.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
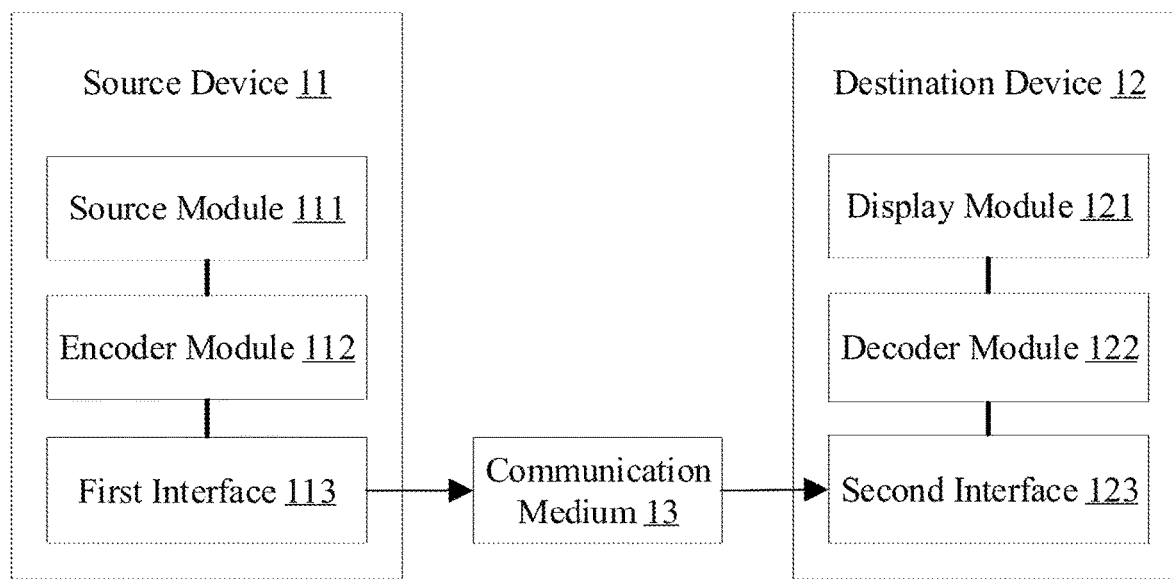
FIG. 1 is a block diagram of an example system configured to encode and decode video data, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any coding function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processors (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram of an example system that may be configured to encode and decode video data according to an example implementation of the present application. In the implementation, the system includes a source device 11, a destination device 12, and a communication medium 13. In at least one implementation, the source device 11 may include any device configured to encode video data and transmit encoded video data to the communication medium 13. In at least one implementation, the destination device 12 may include any device configured to receive encoded video data via the communication medium 13 and to decode encoded video data.

In at least one implementation, the source device 11 may wiredly and/or wirelessly communicate with the destination device 12 via the communication medium 13. The source device 11 may include a source module 111, an encoder module 112, and a first interface 113. The destination device 12 may include a display module 121, a decoder module 122, and a second interface 123. In at least one implementation, the source device 11 may be a video encoder, and the destination device 12 may be a video decoder.

In at least one implementation, the source device 11 and/or the destination device 12 may be a mobile phone, a tablet, a desktop, a notebook, or other electronic devices. FIG. 1 merely illustrates one example of the source device 11 and the destination device 12, and the source device 11 and the destination device 12 in other implementations may include more or less components than illustrated or have a different configuration of the various components.

In at least one implementation, the source module 111 of the source device 11 may include a video capture device to capture a new video, a video archive storing previously captured video, and/or a video feed interface to receive video from a video content provider. In at least one implementation, the source module 111 of the source device 11 may generate computer graphics-based data as the source video, or a combination of live video, archived video, and computer-generated video. In at least one implementation, the video capturing device may be a charge-coupled device (CCD) image sensor, a complementary metal-oxide-semiconductor (CMOS) image sensor, or a camera.

In at least one implementation, the encoder module 112 and the decoder module 122 may each be implemented as any of a variety of suitable encoder/decoder circuitry, such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of the present disclosure. In at least one implementation, each of the encoder module 112 and the decoder module 122 may be included in one or more encoders or decoders, any of which may be integrated as part of a combined encoder/decoder (CODEC) in a respective device.

In at least one implementation, the first interface 113 and the second interface 123 may adopt customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 113 and the second interface 123 may each include any device configured to transmit and/or store a compliant video bitstream to the communication medium 13 and to receive the compliant video bitstream from the communication medium 13. In at least one implementation, the first interface 113 and the second interface 123 may include a computer system interface that may enable a compliant video bitstream to be stored on a storage device or to be received from the storage device. For example, the first interface 113 and the second interface 123 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 121 may include a display using liquid crystal display (LCD) technology, a plasma display technology, an organic light emitting diode (OLED) display technology, or light emitting polymer display (LPD) technology, although other display technologies may be used in other implementations. In at least one implementation, the display module 121 may include a high definition display or an ultra high definition display.

Figure 2:
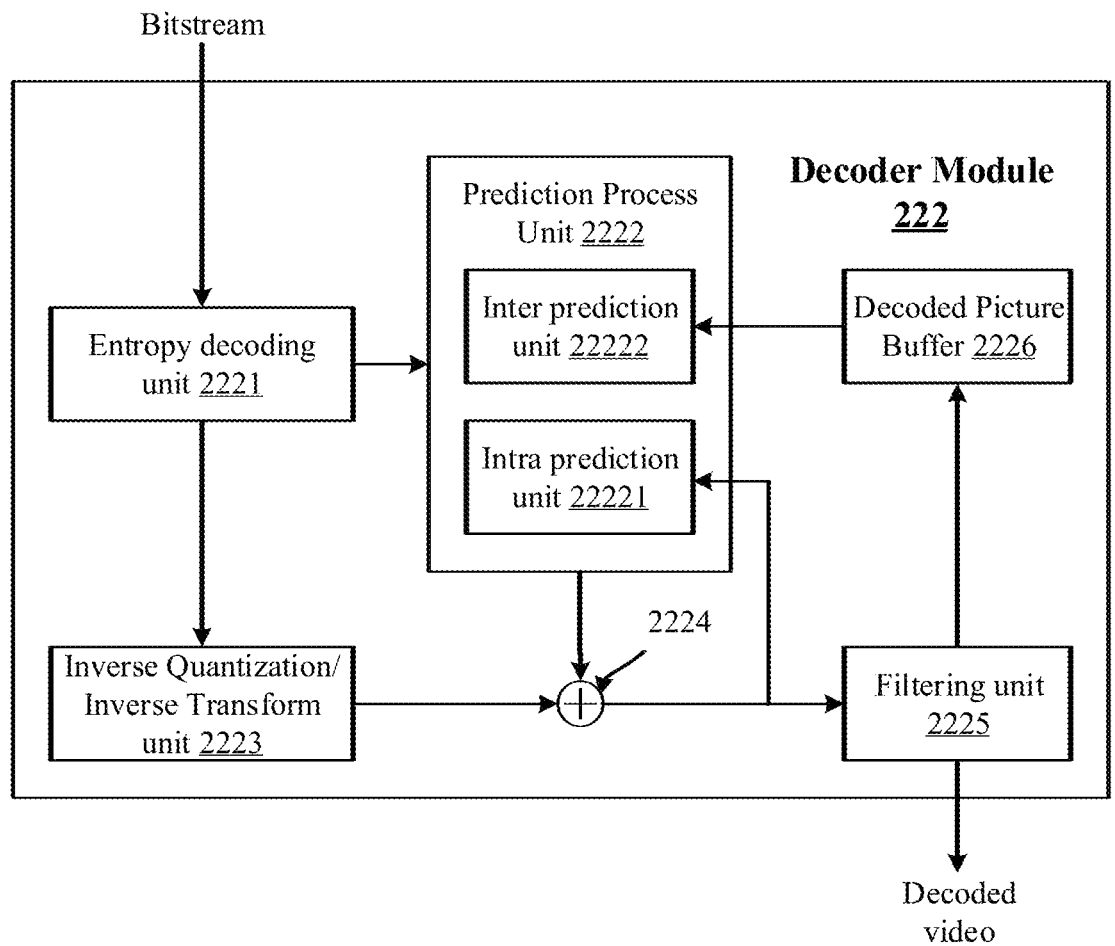
FIG. 2 is a block diagram of an example decoder module of the destination device in the system of FIG. 1, according to an example implementation of the present application.

FIG. 2 is a block diagram of a decoder module 222 representing an example implementation of the decoder module 122 of the destination device 12 in the system of FIG. 1, according to an example implementation of the present application. In at least one implementation, the decoder module 222 includes an entropy decoder (e.g., an entropy decoding unit 2221), a prediction processor (e.g., a prediction process unit 2222), an inverse quantization/inverse transform processor (e.g., an inverse quantization/inverse transform unit 2223), a summer (e.g., a first summer 2224), a filter (e.g., a filtering unit 2225), and a decoded picture buffer (e.g., a decoded picture buffer 2226). In at least one implementation, the prediction process unit 2222 of the decoder module 222 further includes an intra prediction processor (e.g., an intra prediction unit 22221) and an inter prediction processor (e.g., an inter prediction unit 22222). In at least one implementation, the decoder module 222 receives a bitstream, and decodes the bitstream to output a decoded video.

In at least one implementation, the entropy decoding unit 2221 may receive the bitstream including a plurality of syntax elements from the second interface 123 in FIG. 1 and perform a parsing operation on the bitstream to extract syntax elements from the bitstream. As part of performing the parsing operation, the entropy decoding unit 2221 may entropy decode the bitstream to generate quantized transform coefficients, quantization parameters, transform data, motion vectors, intra modes, partition information, and other syntax information. In at least one implementation, the entropy decoding unit 2221 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2221 may provide the quantized transform coefficients, the quantization parameters, and the transform data to the inverse quantization/inverse transform unit 2223, and provide the motion vectors, the intra modes, the partition information, and other syntax information to the prediction process unit 2222.

In at least one implementation, the prediction process unit 2222 may receive syntax elements, such as motion vectors, intra modes, partition information, and other syntax information, from the entropy decoding unit 2221. In at least one implementation, the prediction process unit 2222 may receive the syntax elements including the partition information, and then divide image frames according to the partition information. In at least one implementation, each of the image frames may be divided into at least one image block according to the partition information. The at least one image block may include a luminance block for reconstructing a plurality of luminance samples, and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2222 receives predicted data including the intra mode or the motion vector for a current image block of a specific one of the image frames. The current image block may be one of the luminance block and the at least one of the chrominance block in the specific image frame.

In at least one implementation, the intra prediction unit 22221 may perform intra-predictive coding of a current block unit relative to one or more neighboring blocks in the same frame as the current block unit based on the syntax elements related to the intra mode to generate a predicted block. In at least one implementation, the intra mode may specify the location of reference samples selected from the neighboring blocks within the current frame.

In at least one implementation, the intra prediction unit 22221 may reconstruct a plurality of chroma components of the current block unit based on the plurality of luma components of the current block unit when the luma components of the current block are reconstructed by the prediction process unit 2222.

In at least one implementation, the inter prediction unit 22222 may perform inter-predictive coding of the current block unit relative to one or more blocks in one or more reference image blocks based on the syntax elements related to the motion vector to generate the predicted block. In at least one implementation, the motion vector may indicate a displacement of the current block unit within the current image block relative to a reference block unit within the reference image block. The reference block unit is a block that is determined to closely match the current block unit. In at least one implementation, the inter prediction unit 22222 receives the reference image block stored in the decoded picture buffer 2226 and reconstructs the current block unit based on the received reference image blocks.

In at least one implementation, the inverse quantization/inverse transform unit 2223 may apply inverse quantization and inverse transformation to reconstruct the residual block in the pixel domain. In at least one implementation, the inverse quantization/inverse transform unit 2223 may apply inverse quantization to the residual quantized transform coefficient to generate a residual transform coefficient, and then apply inverse transformation to the residual transform coefficient to generate the residual block in the pixel domain. In at least one implementation, the inverse transformation may be inversely applied by the transformation process, such as discrete cosine transform (DCT), discrete sine transform (DST), adaptive multiple transform (AMT), mode-dependent non-separable secondary transform (MDNSST), hypercube-givens transform (HyGT), signal dependent transform, Karhunen-Loéve transform (KLT), wavelet transform, integer transform, sub-band transform or a conceptually similar transform. In at least one implementation, the inverse transformation may convert the residual information from a transform domain, such as a frequency domain, back to the pixel domain. In at least one implementation, the degree of inverse quantization may be modified by adjusting a quantization parameter.

In at least one implementation, the first summer 2224 adds the reconstructed residual block to the predicted block provided from the prediction process unit 2222 to produce a reconstructed block.

In at least one implementation, the filtering unit 2225 may include a deblocking filter, a sample adaptive offset (SAO) filter, a bilateral filter, and/or an adaptive loop filter (ALF) to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the first summer 2224. In at least one implementation, the filtering unit 2225 may output the decoded video to the display module 121 or other video receiving unit, after the filtering unit 2225 performs the filtering process for the reconstructed blocks of the specific image frame.

In at least one implementation, the decoded picture buffer 2226 may be a reference picture memory that stores the reference block for use in decoding the bitstream by the prediction process unit 2222, e.g., in inter-coding modes. The decoded picture buffer 2226 may be formed by any of a variety of memory devices, such as dynamic random access memory (DRAM), including synchronous DRAM (SDRAM), magneto-resistive RAM (MRAM), resistive RAM (RRAM), or other types of memory devices. In at least one implementation, the decoded picture buffer 2226 may be on-chip with other components of the decoder module 222, or off-chip relative to those components.

Figure 3:
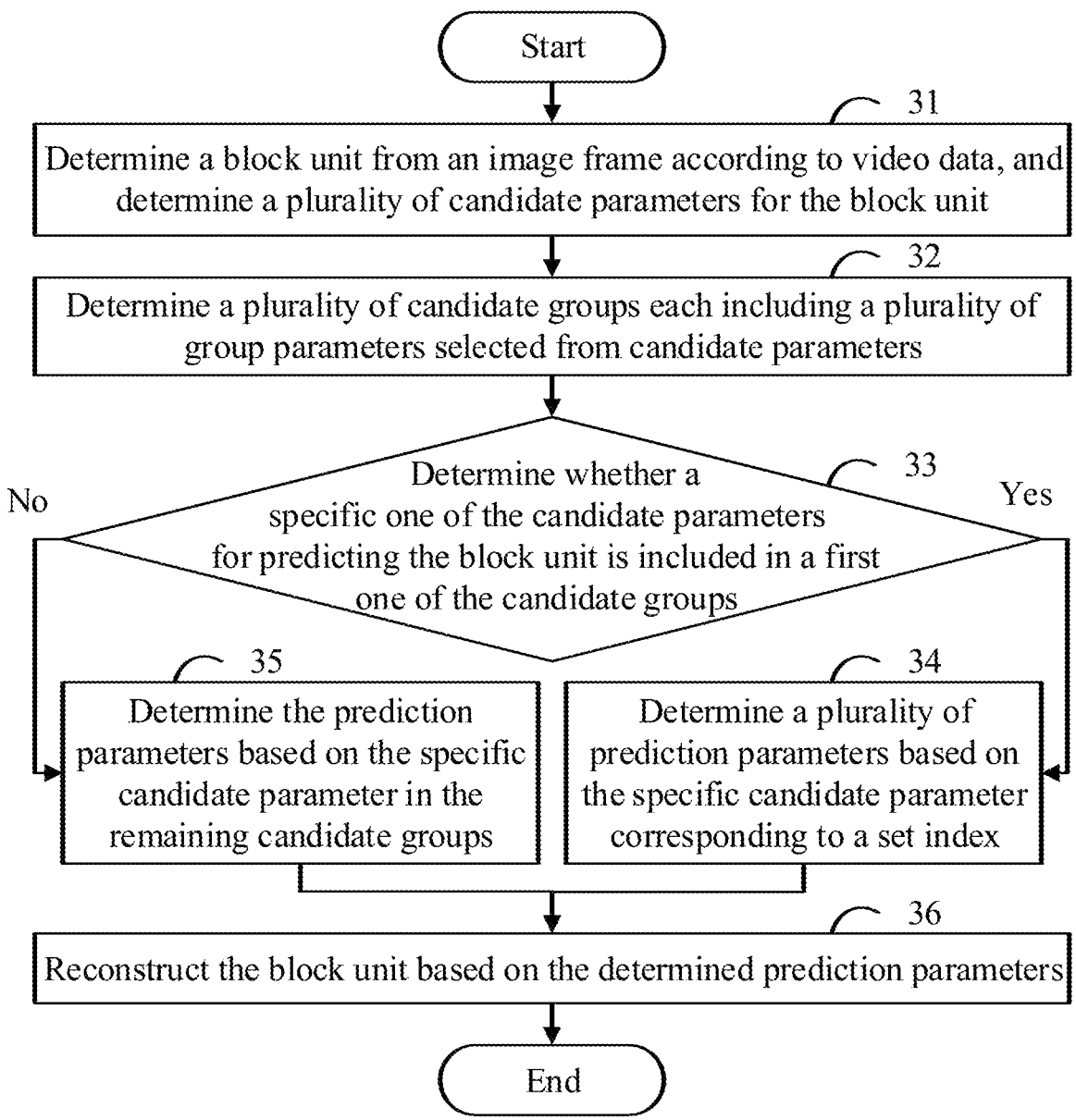
FIG. 3 illustrates a flowchart of an example reconstruction method for reconstructing a block unit based on a plurality of candidate parameters in a plurality of candidate groups, according to an example implementation of the present application.

FIG. 3 illustrates a flowchart of an example reconstruction method for reconstructing a block unit based on a plurality of candidate parameters in a plurality of candidate groups, according to an example implementation of the present application. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 3 may represent one or more processes, methods, or subroutines, carried out in the example method. Furthermore, the order of blocks is illustrative only and may change. Additional blocks may be added or less blocks may be utilized without departing from the present disclosure.

At block 31, the decoder module 222 may determine a block unit from an image frame according to video data and determine a plurality of candidate parameters for the block unit.

In at least one implementation, the video data may be a bitstream. In at least one implementation, the destination device 12 may receive the bitstream from an encoder, such as the source device 11, via the second interface 123 of the destination device 12. The second interface 123 may provide the bitstream to the decoder module 222. The decoder module 222 may determine the image frame based on the bitstream, and divide the image frame to determine the block unit according to a plurality of partition indications in the bitstream. For example, the decoder module 222 may divide the image frames to generate a plurality of coding tree units, and further divide one of the coding tree units to determine the block unit according to the partition indications based on a video coding standard.

In at least one implementation, the source device 11 may determine the candidate parameters of a prediction mode for the block unit and select a plurality of prediction parameters from the candidate parameters to predict the block unit. In at least one implementation, the prediction mode may be a merge mode with motion vector difference (MMVD) mode selected from a plurality of candidate modes. In the implementation, the source device 11 may provide a plurality of prediction indications indicating the prediction parameters of the block unit in the bitstream to the destination device 12. In at least one implementation, the entropy decoding unit 2221 may decode the bitstream to determine the prediction indications for the block unit, and then the decoder module 222 may further reconstruct the block unit based on the prediction indications. In at least one implementation, the prediction indications may include a plurality of flags and a plurality of indices.

In at least one implementation, the prediction mode may include a plurality of motion parameters when the prediction mode is the MMVD mode. In at least one implementation, the motion parameters may include a base motion, a motion difference, and a prediction direction. In at least one implementation, each of the motion parameters may include the candidate parameters. In at least one implementation, the prediction indications may include at least one of a base candidate index, a motion difference indication, and a prediction direction index for the MMVD mode. In at least one implementation, the prediction parameter for each of the motion parameters may be selected based on a corresponding one of the prediction indications. For example, the prediction parameter of the base motion may be selected from the candidate parameters of the base motion based on the base candidate index.

In at least one implementation, the inter prediction unit 22222 may generate a plurality of base candidates for the block unit based on the neighbor motion information. In at least one implementation, the base candidates are the candidate parameters for selecting the base motion. In at least one implementation, the base candidate index may be an MMVD flag mmvd_cand_flag indicating the selected base candidate included in the prediction parameters. For example, the base candidates may be generated in a skip mode, a direct mode, and a merge mode based on a video coding standard, such as high efficiency video coding (HEVC) or versatile video coding (VVC). Each of the base candidates may include at least one frame candidate and at least one vector candidate. In one implementation, a specific one of the base candidates may include a first frame candidate in a first reference list L0, a first vector candidate corresponding to the first frame candidate, a second frame candidate in a second reference list L1, and a second vector candidate corresponding to the second frame candidate, when the specific base candidate is a bi-predictive candidate. In another implementation, the specific base candidate may include the first frame candidate in the first reference list L0, and the first vector candidate corresponding to the first frame candidate, when the specific base candidate is a uni-predictive candidate for the first reference list L0. In other implementations, the specific base candidate may include the second frame candidate in the second reference list L1, and the second vector candidate corresponding to the second frame candidate, when the specific base candidate is the uni-predictive candidate for the second reference list L1.

In at least one implementation, the motion difference indication may further include a motion distance index and a motion direction index. In at least one implementation, the inter prediction unit 22222 may select one of the base candidates based on the base candidate index and determine a motion difference based on the motion difference indication to adjust the vector candidate in the selected base candidate. In one implementation, the motion difference may be represented by a difference magnitude and a difference direction determined based on the motion distance index and the motion direction index. In at least one implementation, the motion distance index may be a first MMVD index mmvd_distance_idx indicating the difference magnitude included in the prediction parameters, and the motion direction index may be a second MMVD index mmvd_direction_idx indicating the difference direction included in the prediction parameters. In at least one implementation, a plurality of difference distance candidates may be the candidate parameters for selecting the difference magnitude based on the motion distance index, and a plurality of difference direction candidates may be the candidate parameters for selecting the difference direction based on the motion direction index.

In at least one implementation, the difference direction may indicate a direction angle for adjusting the vector candidate determined based on the base candidate index. In one implementation, each of the direction angles may be predefined by the motion direction index. For example, the direction angles may include 0°, 22.5°, 37.5°, 150° or any other angles. In at least one implementation, the motion direction index may indicate one of four coordination directions (+,0), (0,+), (−,0), and (0,−). In the implementation, the direction angles of the four coordination directions may be 0°, 90°, 180°, and 270°. In one implementation, the motion difference indication may be a motion difference index indicating the motion difference including an x-coordinate difference and a y-coordinate difference. Thus, the inter prediction unit 22222 may determine the motion difference based on the x-coordinate difference and the y-coordinate difference indicated by the motion difference index to adjust the selected vector candidate.

In at least one implementation, the inter prediction unit 22222 may select at least one of the first reference list L0 and the second reference list L1 from a plurality of prediction direction candidates based on the prediction direction index. When the block unit is predicted based on one of the first frame candidates in the first reference list L0 and one of the second frame candidates in the second reference list L1, the block unit is a bi-predicted block predicted based on the first reference list L0 and the second reference list L1. When the block unit is predicted based on one of the first frame candidates in the first reference list L0, the block unit is a un-predicted block predicted based on the first reference list L0. When the block unit is predicted based on one of the second frame candidates in the second reference list L1, the block unit is a uni-predicted block predicted based on the second reference list L1. In the implementation, the inter prediction unit 22222 may check the relationship between the base candidate index and the prediction direction index. When the reference list determined by the prediction direction index is different from the reference list determined by the base candidate index, the inter prediction unit 22222 may search a frame candidate in the reference list determined by the prediction direction index by mirroring the frame candidate in the reference list determined by the base candidate index. For example, there is no corresponding frame for the block unit in the second reference list L1, when the prediction direction index indicates that the block unit is bi-predicted and the base candidate index may indicate a uni-predictive candidate. Thus, the inter prediction unit 22222 may mirror the first frame candidate in the first reference list L0 determined by the base candidate index into the second reference list L1 to select one of the second frame candidates. In addition, the inter prediction unit 22222 may mirror the first vector candidate corresponding to the first reference list L0 determined by the base candidate index to determine the second vector candidate for the second reference list L1. In at least one implementation, there may be no prediction direction index in the prediction indications. In the implementation, the reference list determined by the base candidate index may be the reference list of the block unit.

In at least one implementation, the prediction indications may include a set index. In the implementation, the set index may represent at least one of the base candidate index, the motion difference index, and the prediction direction index, when the motion difference indication is the motion difference index. In at least one implementation, the set index may represent at least one of the base candidate index, the motion distance index, the motion direction index, and the prediction direction index, when the motion difference indication includes the motion distance index and the motion direction index. For example, the decoder module 222 may directly determine the difference magnitude and the difference direction from the set index, when the set index represents the motion distance index and the motion direction index. In addition, the decoder module 222 may determine the difference magnitude base on the set index, when the set index only represents the motion distance index.

Referring back to FIG. 3, at block 32, the decoder module 222 may determine a plurality of candidate groups that each includes a plurality of group parameters selected from the candidate parameters.

In at least one implementation, the inter prediction unit 22222 may determine a plurality of previous blocks from the bitstream. In the implementation, the previous blocks reconstructed by a plurality of previous modes selected from the candidate modes are decoded prior to the block unit. In at least one implementation, the previous modes may include a plurality of previous parameters selected from the candidate parameters, when the previous modes are the MMVD mode. Thus, the inter prediction unit 22222 may determine the previous modes of the previous blocks and classify the candidate parameters identical, or similar, to the previous parameters of the prediction modes into a first candidate group. For example, the inter prediction unit 22222 may compare the difference distance candidates and the difference direction candidates in the candidate parameters with the difference magnitudes and the difference directions of the previous modes of the previous blocks when the inter prediction unit 22222 uses the set index to represent difference magnitude and the difference direction. In addition, the inter prediction unit 22222 may compare the difference distance candidates in the candidate parameters with the difference magnitudes of the previous modes of the previous blocks, when the inter prediction unit 22222 uses the set index to represent the difference magnitudes.

Figure 4A:
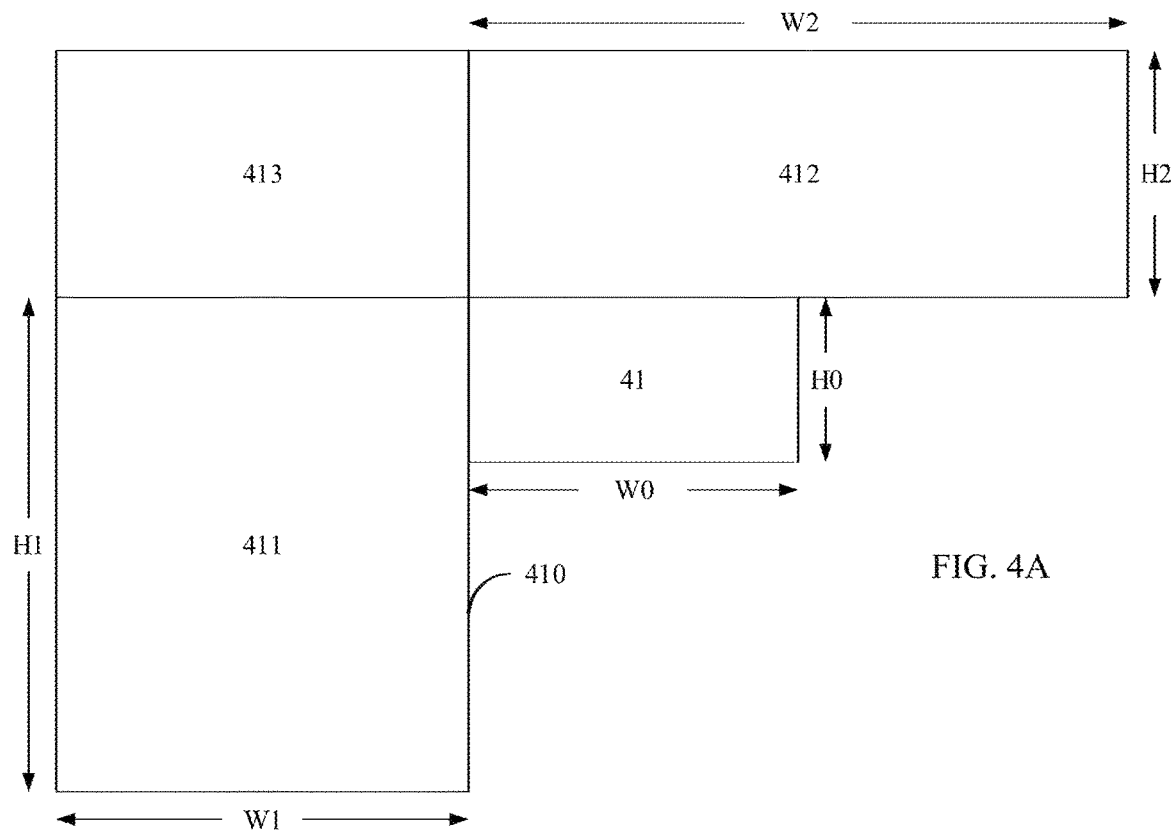
FIGS. 4A-4C are schematic illustrations of a block unit and a plurality of search areas, according to example implementations of the present application.
Figure 4B:
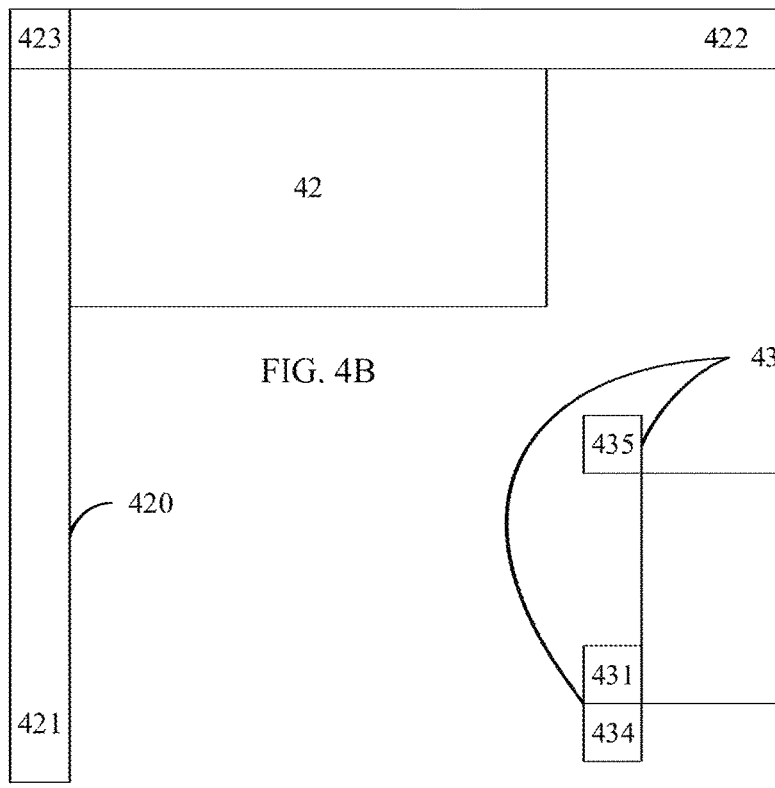
Figure 4C:
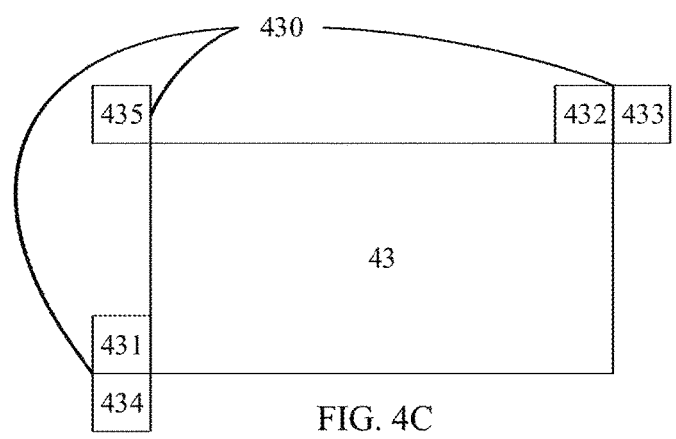

In at least one implementation, the decoder module 222 may divide the image frame to determine the block unit according to the partition indications in the bitstream and determine a search area based on a plurality of predefined regions. FIGS. 4A-4C are schematic illustrations of example implementations of the block units 41-43 and the search areas 410-430. In one implementation, the search area 410 of the block unit 41 in FIG. 4A includes a first search region 411 located to the left side of the block unit 41, a second search region 412 located above the block unit, and a third search region 413 located at the upper-left side of the block unit 41. The first search region 411 has a first region width W1 and a first region height H1, the second search region 412 has a second region width W2 and a second region height H2. The region width of the third search region 413 may be equal to the first region width W1, and the region height of the third search region 413 may be equal to the second region height H2. In one implementation, each of the first region width W1, the second region width W2, the first region height H1, and the second region height H2 may be different from one another. In another implementation, at least two of the first region width W1, the second region width W2, the first region height H1, and the second region height H2 may be equal to each other. For example, the first region width W1 of the first search region 421 of the block unit 42 may be equal to the second region height H2 of the second search region 422 of the block unit 42 in FIG. 4B. As a result, the third search region 423 of the block unit 42 may be a square search region. In one implementation, each of the first region width W1, the second region width W2, the first region height H1, and the second region height H2 may be divisible by four. In one implementation, each of the first region width W1, the second region width W2, the first region height H1, and the second region height H2 may be predefined as a preset length. In another implementation, the encoder module 112 of the source device 11 may determine the lengths of the first region width W1, the second region width W2, the first region height H1, and the second region height H2, and provide at least one of the prediction indications in one of a sequence parameter set (SPS) and a picture parameter set (PPS) in the bitstream. Thus, the decoder module 222 may determine the lengths of the first region width W1, the second region width W2, the first region height H1, and the second region height H2 from one of the SPS and PPS in the bitstream. In other implementations, the first region width W1, the second region width W2, the first region height H1, and the second region height H2 may be proportional to a block width W0 and a block height H0 of the block unit 41. Thus, the inter prediction unit 22222 may determine the lengths of the first region width W1, the second region width W2, the first region height H1, and the second region height H2 based on a plurality of predefined ratio parameters.

In at least one implementation, the search area 430 of the block unit 43 in FIG. 4C may include a plurality of search blocks neighboring the block unit 43. For example, the search area 430 may include a first search block 431, a second search block 432, a third search block 433, a fourth search block 434, and a fifth search block 435. In one implementation, the search blocks 431-435 may be identical to a plurality of spatial blocks neighboring the block unit 41 used for a plurality of inter merge candidates by the inter prediction unit 22222. In one implementation, the search block widths and the search block heights of the search blocks may be equal to four.

In at least one implementation a previously decoded slice may be defined as a search area. In the implementation, each of a plurality of previous blocks in the previously decoded slice are decoded prior to the block unit. In the implementation, the previous blocks reconstructed by a plurality of prediction modes selected from the prediction candidates are decoded prior to the block unit.

In at least one implementation, the inter prediction unit 22222 may determine the previous modes of the previous blocks in the search area. In at least one implementation, the inter prediction unit 22222 may divide the search area to generate a plurality of sub-blocks. In one implementation, each of the sub-blocks may have a block size equal to 4×4. In the implementation, each of the sub-blocks may be included in one of the previous blocks. The inter prediction unit 22222 may determine that the previous mode of a specific one of the sub-blocks is identical to the previous mode of a specific one of the previous blocks when the specific sub-block is included in the specific previous block. Thus, the inter prediction unit 22222 may determine the previous modes of the sub-blocks and calculate the quantity of the sub-blocks predicted based on the candidate parameters. Thus, the inter prediction unit 22222 may determine the usage rates of the candidate parameters. In at least one implementation, the inter prediction unit 22222 may arrange the candidate parameters based on the usage rates. In the implementation, the inter prediction unit 22222 may arrange the candidate parameters based on the usage rates from largest to smallest.

In at least one implementation, the inter prediction unit 22222 may arrange the candidate parameters for each of the motion parameters according to previous modes of the previous blocks to generate a sorted candidate list. Then, the inter prediction unit 22222 may add the first Nm candidate parameters for one of the motion parameters in the sorted candidate list into the first candidate group. In at least one implementation, Nm may be an integer greater than zero. In at least one implementation, the inter prediction unit 22222 may arrange the candidate parameters for one of the motion parameters according to usage rates of the previous modes to generate the sorted candidate list. In addition, the number of bits in the bitstream for a first one of the group parameters in the first candidate group may be less than the number of bits in the bitstream for a second one of the group parameters in the first candidate group.

In at least one implementation, the maximum quantity of the group parameters in the first candidate group may be Nm. In one implementation, the number of the group parameters in the first candidate group may be equal to zero when the decoder module 222 starts to decode the bitstream. When the inter prediction unit 22222 determines that a first block in the video data is predicted based on the MMVD mode having the previous parameters, the inter prediction unit 22222 may add the candidate parameter identical to the previous parameters of the MMVD mode into the first candidate group. Thus, the number of the group parameters in the first candidate group may increase to one. In at least one implementation, the number of the group parameters in the first candidate group may be equal to the maximum quantity Nm when the number of the previous modes is equal to or greater than Nm. Thus, the inter prediction unit 22222 may remove a first added one of the candidate parameters from the first candidate group when a new previous mode is determined for adding into the Nm group parameters in the first candidate group.

In at least one implementation, the inter prediction unit 22222 may classify the remaining candidate parameters into the other candidate groups. In one implementation, the number of the group parameters in the first candidate group may be greater, or less, than the number of the group parameters in the other candidate groups. In another implementation, the number of the group parameters in the first candidate group may be equal to the number of the group parameters in the other candidate groups.

In at least one implementation, a distribution of the candidate parameters in the candidate groups may be predefined (e.g., in the encoder module 112 and the decoder module 222). Thus, the inter prediction unit 22222 may directly determine a classified result of the candidate parameters in the candidate groups from the decoder module 222. In at least one implementation, the inter prediction unit 22222 may directly determine the candidate groups that include the group parameters. In the implementation, the group parameters in each of the candidate groups may be predefined in the decoder module 222.

Referring back to FIG. 3, at block 33, the decoder module 222 may determine whether a specific one of the candidate parameters for predicting the block unit is included in the first candidate group. If the specific candidate parameter of the block unit is included in the first candidate group, the procedure may proceed to block 34. If the specific candidate parameter of the block unit is not included in the first candidate group, the procedure may proceed to block 35.

In at least one implementation, the prediction indications may further include the set flag indicating whether the specific candidate parameter of the block unit is included in the first candidate group. Thus, the inter prediction unit 22222 may directly determine that the specific candidate parameter of the block unit is included in the first candidate group when the set flag is equal to one. In addition, the inter prediction unit 22222 may directly determine that the specific candidate parameter of the block unit is not included in the first candidate group when the set flag is equal to zero. In at least one implementation, the set flag may be an fpel_mmvd_enable_flag to indicate whether the specific candidate parameter of the block unit is included in the first candidate group. In at least one implementation, the set flag may be a slice_fpel_mmvd_enabled_flag when the set flag is included in a slice header.

At block 34, the decoder module 222 may determine the prediction parameters based on the specific candidate parameter corresponding to the set index.

In at least one implementation, each of the group parameters in the first candidate group may correspond to one index value of the set index. Thus, the inter prediction unit 22222 may determine the specific candidate parameter based on the set index, since the specific candidate parameter is included in the first candidate group.

In at least one implementation, the inter prediction unit may determine the prediction parameters based on the set index. For example, the inter prediction unit 22222 may directly determine the base candidate and the motion difference of the block unit from the set index when the set index represents the base candidate index and the motion difference index. In addition, the inter prediction unit 22222 may further determine whether the block unit is a bi-predicted block or a uni-predicted block based on the prediction direction index. Thus, the decoder module 222 may select one of the vector candidates and one of the frame candidates based on the determined base candidate and adjust the selected vector candidates to generate a motion vector corresponding to the selected frame candidate. Then, the decoder module 222 may determine whether to mirror the motion vector to generate a mirror vector based on the selected frame candidate and the prediction direction index. In at least one implementation, the inter prediction unit 22222 may determine the difference magnitude of the block unit from the set index, when the set index represents the motion distance index. Thus, the inter prediction unit may further determine the base candidate and the difference direction based on the base candidate index and the motion direction index for predicting the block unit based on the determined base candidate, the determined difference magnitude, and the determined difference direction.

At block 35, the decoder module 222 may determine the prediction parameters based on the specific candidate parameter in the remaining candidate groups.

In at least one implementation, each of the group parameters in the remaining candidate groups may correspond to one index value of a group index. Thus, the inter prediction unit 22222 may determine the specific candidate parameter by the group index, when the specific candidate parameter is included in the remaining candidate groups. In at least one implementation, all of the candidate parameters excluded in the first candidate group may be added into the remaining candidate groups. In at least one implementation, the candidate parameters represented by the set index for the first candidate group may be identical to the candidate parameters represented by the group index for each of the remaining candidate groups. For example, the inter prediction unit 22222 may determine that the group index may indicate the base candidate and the motion difference in the remaining candidate groups, when the set index indicates the base candidate and the motion difference in the first candidate group. Thus, the decoder module 222 may select one of the vector candidates and one of the frame candidates based on the determined base candidate (e.g., determined by the group index), determine the motion difference determined by the group index, and adjust the selected vector candidates to generate a motion vector corresponding to the selected frame candidate based on the determined motion difference. In at least one implementation, the group index may indicate the difference magnitude in the remaining candidate groups when the set index only indicates the difference magnitude in the first candidate group.

In at least one implementation, the number of the candidate groups may be greater than two. For example, the number of the candidate groups may be equal to four. The inter prediction unit 22222 may classify the candidate parameters into the four candidate groups based on the prediction modes of the previous blocks. In the implementation, the set flag may be changed to an index indicating which of the candidate groups includes the specific candidate parameter.

In at least one implementation, the set index and the group index may be represented by the same index when the number of the candidate groups is equal to two. In at least one implementation, one of the prediction indications may be regarded as the set index to determine at least one of the prediction parameters when the specific candidate parameter is included in the first candidate group. In at least one implementation, the one of the prediction indications may be regarded as the group index to determine the at least one of the prediction parameters when the specific candidate parameter is included in the other candidate group.

In at least one implementation, the inter prediction unit 22222 may determine the specific candidate parameter in the remaining candidate groups without the group index. The inter prediction unit 22222 may determine the base candidate by the base candidate index and determine the motion difference by the motion difference indication. In addition, the inter prediction unit 22222 may further determine whether the block unit is a bi-predicted block or a uni-predicted block based on the prediction direction index. Thus, the decoder module 222 may select one of the vector candidates and one of the frame candidates based on the determined base candidate and adjust the selected vector candidates to generate the motion vector corresponding to the selected frame candidate. In addition, the decoder module 222 may determine whether to mirror the motion vector to generate the mirror vector and mirror the selected frame candidate to generate the mirrored frame candidate based on the selected frame candidate and the prediction direction index.

Referring back to FIG. 3, at block 36, the decoder module 222 may reconstruct the block unit based on the determined prediction parameters.

In at least one implementation, the inter prediction unit 22222 may generate a predicted component for one of the block components in the block unit according to the prediction parameters. In at least one implementation, the first summer 2224 may generate a plurality of reconstructed components based on the predicted components and a plurality of residual components for reconstructing the block unit. In the implementation, the first summer 2224 may receive the residual components of the block unit via the entropy decoding unit 2221 and the inverse quantization/inverse transform unit 2223. In the implementation, the residual components may be determined from the bitstream. In at least one implementation, the decoder module 222 may reconstruct all of the other block units in the image frame for reconstructing the image frame and the video.

Figure 5:
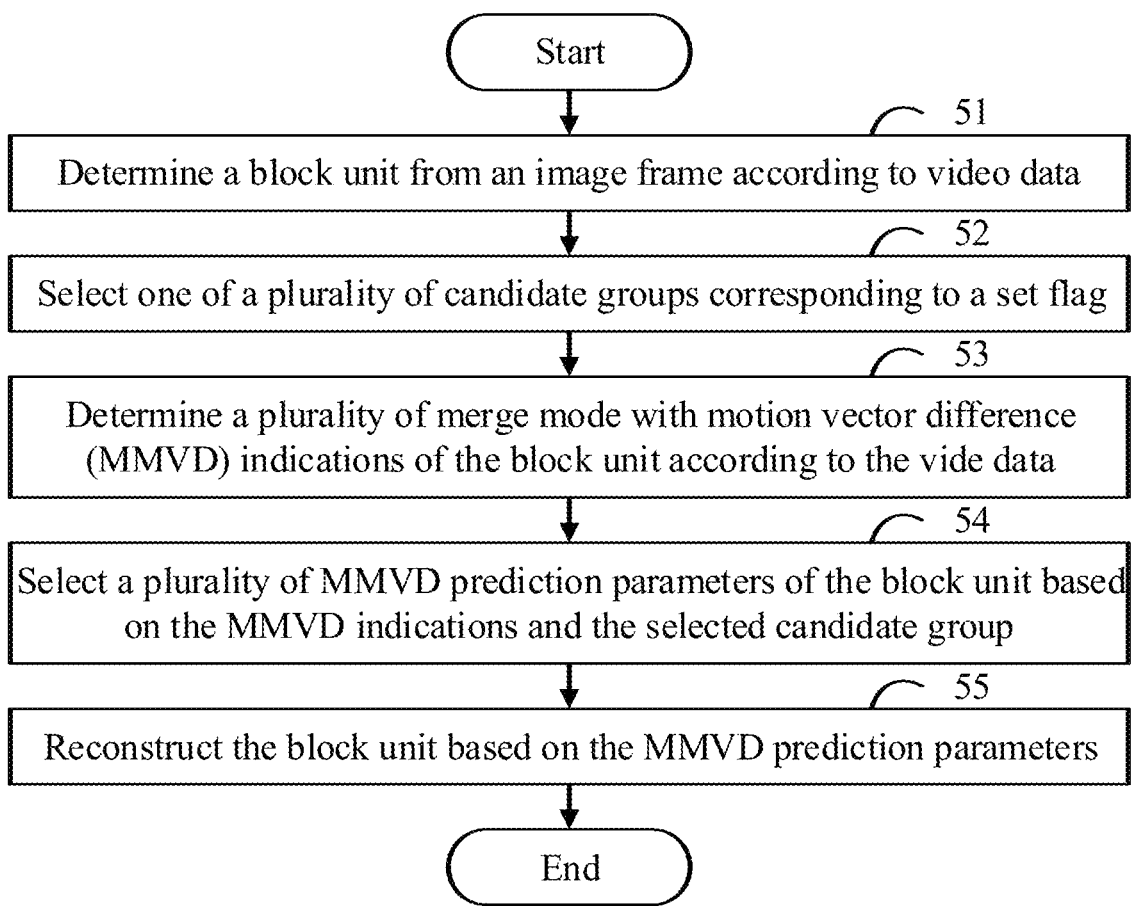
FIG. 5 illustrates a flowchart of an example reconstruction method for reconstructing a block unit based on a plurality of MMVD candidate parameters in a plurality of candidate groups, according to an example implementation of the present application.

FIG. 5 illustrates a flowchart of an example reconstruction method for reconstructing a block unit based on a plurality of merge mode with motion vector difference (MMVD) candidate parameters in a plurality of candidate groups, according to an example implementation of the present application. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 5 may represent one or more processes, methods, or subroutines, carried out in the example method. Furthermore, the order of blocks is illustrative only and may change. Additional blocks may be added or less blocks may be utilized without departing from the present disclosure.

At block 51, the decoder module 222 may determine a block unit from an image frame according to video data.

In at least one implementation, the video data may be a bitstream. In at least one implementation, the destination device 12 may receive the bitstream from an encoder, such as the source device 11, via the second interface 123 of the destination device 12. The second interface 123 may provide the bitstream to the decoder module 222. The decoder module 222 may determine the image frame based on the bitstream and divide the image frame to determine the block unit according to a plurality of partition indications in the bitstream. For example, the decoder module 222 may divide the image frames to generate a plurality of coding tree units, and further divide one of the coding tree units to determine the block unit according to the partition indications based on a video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 52, the prediction process unit 2222 may select one of a plurality of candidate groups corresponding to the set flag.

In at least one implementation, there may be a plurality of motion parameters for predicting the block unit when the block unit is predicted in the MMVD mode. In at least one implementation, the motion parameters may include a base motion, a motion difference, and a prediction direction. In at least one implementation, each of the motion parameters may include a plurality of candidate parameters. In at least one implementation, the decoder module 222 may select a prediction parameter from the candidate parameters for each of the motion parameters. For example, one of the prediction parameters may be selected from the candidate parameters of the base motion.

In at least one implementation, the inter prediction unit 22222 may generate the plurality of base candidates for the block unit based on the neighbor motion information. In at least one implementation, the base candidates may be the candidate parameters for selecting the base motion. For example, the base candidates may be generated in a skip mode, a direct mode, and a merge mode based on a video coding standard, such as high efficiency video coding (HEVC), or versatile video coding (VVC). Each of the base candidates may include at least one frame candidate and at least one vector candidate. In one implementation, a specific one of the base candidates may include a first frame candidate in a first reference list L0, a first vector candidate corresponding to the first frame candidate, a second frame candidate in a second reference list L1, and a second vector candidate corresponding to the second frame candidate, when the specific base candidate is a bi-predictive candidate. In another implementation, the specific base candidate may include the first frame candidate in the first reference list L0, and the first vector candidate corresponding to the first frame candidate, when the specific base candidate is a uni-predictive candidate for the first reference list L0.

In at least one implementation, the motion difference may further include a difference magnitude and a difference direction. In at least one implementation, the inter prediction unit 22222 may select one of the base candidates and determine the motion difference to adjust the vector candidate in the selected base candidate. In at least one implementation, a plurality of difference distance candidates are the candidate parameters for selecting the difference magnitude, and a plurality of difference direction candidates are the candidate parameters for selecting the difference direction. In at least one implementation, the difference direction may indicate a direction angle for adjusting the vector candidate of the selected base candidate. In at least one implementation, the difference direction candidates may include four coordination directions (+,0), (0,+), (−,0), and (0,−). In the implementation, direction angles of the four coordination directions may be 0°, 90°, 180°, and 270°.

In at least one implementation, the inter prediction unit 22222 may select at least one of the first reference list L0 and the second reference list L1 for predicting the block unit. When the block unit is predicted based on one of the first frame candidates in the first reference list L0 and one of the second frame candidates in the second reference list L1, the block unit is a bi-predicted block predicted based on the first reference list L0 and the second reference list L1. When the block unit is predicted based on one of the first frame candidates in the first reference list L0, the block unit is a uni-predicted block predicted based on the first reference list L0. When the reference list for predicting the block unit is different from the reference list determined by the base motion, the inter prediction unit 22222 may search a frame candidate in the reference list of the block unit by mirroring the frame candidate in the reference list determined by the base motion.

In at least one implementation, the candidate parameters of the motion parameters may include a plurality of first MMVD candidate parameters for selecting one or more first motion parameters and a plurality of second MMVD candidate parameters for selecting one or more second motion parameters. In at least one implementation, the first MMVD candidate parameters of the one or more first motion parameters may be distributed in the candidate groups. In at least one implementation, each of the candidate groups includes one or more first MMVD candidate lists that each includes the first MMVD candidate parameters for predicting a corresponding one of the first motion parameters. In at least one implementation, the number of the one or more first motion parameters may be equal to the number of the one or more first MMVD candidate lists in each of the candidate groups. In at least one implementation, the second MMVD candidate parameters may be included in one or more second MMVD candidate lists different from the first MMVD candidate lists. In at least one implementation, the second MMVD candidate parameters may be excluded from the candidate groups.

In at least one implementation, a distribution of the candidate parameters in the candidate groups may be predefined (e.g., in the encoder module 112 and the decoder module 222). Thus, the inter prediction unit 22222 may directly determine a classified result of the first MMVD candidate parameters in the candidate groups from the decoder module 222. In at least one implementation, the inter prediction unit 22222 may directly determine the candidate groups that include the first MMVD candidate parameters. In the implementation, the first MMVD candidate parameters in each of the candidate groups may be predefined in the decoder module 222.

In at least one implementation, the prediction indications may further include the set flag indicating whether at least one of the prediction parameters of the block unit is selected from a specific one of the candidate groups. Thus, the inter prediction unit 22222 may directly determine that the at least one of the prediction parameters of the block unit is selected from the specific candidate group when the set flag is equal to one. In addition, the inter prediction unit 22222 may directly determine that the at least one of the prediction parameters of the block unit is not selected from the specific candidate group when the set flag is equal to zero. In at least one implementation, the set flag may be an fpel_mmvd_enable_flag to indicate whether the at least one of the prediction parameters of the block unit is selected from the specific candidate group. In at least one implementation, the set flag may be a slice_fpel_mmvd_enabled_flag when the set flag is included in a slice header.

Referring back to FIG. 5, at block 53, the prediction process unit 2222 may determine a plurality of MMVD indications of the block unit according to the video data.

In at least one implementation, the prediction indications may include at least one of a base candidate index, a motion difference indication, and a prediction direction index for the MMVD mode. In at least one implementation, the decoder module may select one of the prediction parameters from the candidate parameters for each of the motion parameters based on a corresponding one of the prediction indications. For example, one of the prediction parameters may be selected from the candidate parameters of the base motion based on the base candidate index.

In at least one implementation, the base candidate index may be an MMVD flag mmvd_cand_flag indicating the selected base candidate included in the prediction parameters. In one implementation, the base motion of the block unit may indicate the first frame candidate in the first reference list L0, the first vector candidate corresponding to the first frame candidate, the second frame candidate in the second reference list L1, and the second vector candidate corresponding to the second frame candidate when the base motion of the block unit is the bi-predictive candidate selected from the base candidates based on the base candidate index.

In at least one implementation, the motion difference indication may further include a motion distance index and a motion direction index. In at least one implementation, the inter prediction unit 22222 may determine the motion difference based on the motion difference indication to adjust the vector candidate in the selected base candidate. In at least one implementation, the motion distance index may be a first MMVD index mmvd_distance_idx indicating the difference magnitude from the difference distance candidates, and the motion direction index may be a second MMVD index mmvd_direction_idx indicating the difference direction from the difference direction candidates. In at least one implementation, the motion difference indication may be a motion difference index indicating the motion difference including an x-coordinate difference and a y-coordinate difference. Thus, the inter prediction unit 22222 may determine the motion difference based on the x-coordinate difference and the y-coordinate difference indicated by the motion difference index to adjust the selected vector candidate.

In at least one implementation, the inter prediction unit 22222 may select the at least one of the first reference list L0 and the second reference list L1 from a plurality of prediction direction candidates based on the prediction direction index. When the reference list determined by the prediction direction index is different from the reference list determined by the base candidate index, the inter prediction unit 22222 may search a frame candidate in the reference list determined by the prediction direction index by mirroring the frame candidate in the reference list determined by the base candidate index. In at least one implementation, there may be no prediction direction index in the prediction indications. In the implementation, the reference list determined by the base candidate index is preset as the selected reference list for predicting the block unit.

In at least one implementation, the prediction indications may include a set index. In the implementation, the set index may represent at least one of the base candidate index, the motion difference index, and the prediction direction index when the motion difference indication is the motion difference index. In at least one implementation, the set index may represent at least one of the base candidate index, the motion distance index, the motion direction index, and the prediction direction index, when the motion difference indication includes the motion distance index and the motion direction index. For example, the decoder module 222 may directly determine the difference magnitude and the difference direction from the set index, when the set index represents the motion distance index and the motion direction index. In addition, the decoder module 222 may determine the difference magnitude base on the set index, when the set index only represents the motion distance index. In the implementation, the sex index is the motion distance index. In at least one implementation, the difference distance candidates and the difference direction candidates may be the group parameters distributed in the candidate groups, when the set index represents the motion distance index and the motion direction index. In the implementation, the base candidates and the prediction direction candidates are not included in the candidate groups. In at least one implementation, the difference distance candidates may be the group parameters distributed in the candidate groups, when the set index represents the motion distance index. In the implementation, the base candidates, the difference direction candidates, and the prediction direction candidates are not included in the candidate groups.

In at least one implementation, the inter prediction unit 22222 may directly determine the at least one of the prediction parameters from the specific candidate group based on the set index, when the set flag is equal to one. In addition, the inter prediction unit 22222 may directly determine the at least one of the prediction parameters in the other candidate groups based on a group index, when the set flag is equal to zero. In at least one implementation, the set index and the group index may be represented by the same index, when the number of the candidate groups is equal to two. In at least one implementation, one of the prediction indications may be regarded as the set index to determine at least one of the prediction parameters, when the set flag indicating the specific candidate group is equal to one. In the implementation, the one of the prediction indications may be regarded as the group index to determine the at least one of the prediction parameters, when the set flag indicating the other candidate group is equal to zero.

Referring back to FIG. 5, at block 54, the decoder module 222 may select a plurality of MMVD prediction parameters of the block unit based on the MMVD indications and the selected candidate group.

In at least one implementation, the prediction parameters are the MMVD prediction parameters, when the block unit is predicted in the MMVD mode. In at least one implementation, the inter prediction unit 22222 may determine the MMVD prediction parameters based on the set index and the other prediction indications, when the set flag is equal to one. For example, the inter prediction unit 22222 may directly determine the base candidate and the motion difference of the block unit based on the set index and determine whether the block unit is a bi-predicted block or a uni-predicted block based on the prediction direction index, when the set index represents the base candidate index and the motion difference index. In at least one implementation, the inter prediction unit 22222 may determine the difference magnitude of the block unit based on the set index and determine the other prediction parameters based on the base candidate index, the difference direction index and the prediction direction index, when each of the set index and the group index represents the motion distance index.

In at least one implementation, the inter prediction unit 22222 may determine the MMVD prediction parameters based on the group index and the other prediction indications, when the set flag is equal to zero. For example, the inter prediction unit 22222 may determine the difference magnitude of the block unit from the group index and determine the other prediction parameters based on the base candidate index, the difference direction index and the prediction direction index, when each of the set index and the group index represents the motion distance index.

At block 55, the decoder module 222 may reconstruct the block unit based on the MMVD prediction parameters.

In at least one implementation, the inter prediction unit 22222 may generate a predicted component for one of the block components in the block unit according to the prediction parameters. In at least one implementation, the first summer 2224 may generate a plurality of reconstructed components based on the predicted components and a plurality of residual components for reconstructing the block unit. In the implementation, the first summer 2224 may receive the residual components of the block unit via the entropy decoding unit 2221 and the inverse quantization/inverse transform unit 2223. In the implementation, the residual components may be determined from the bitstream. In at least one implementation, the decoder module 222 may reconstruct all of the other block units in the image frame for reconstructing the image frame and the video.

Figure 6:
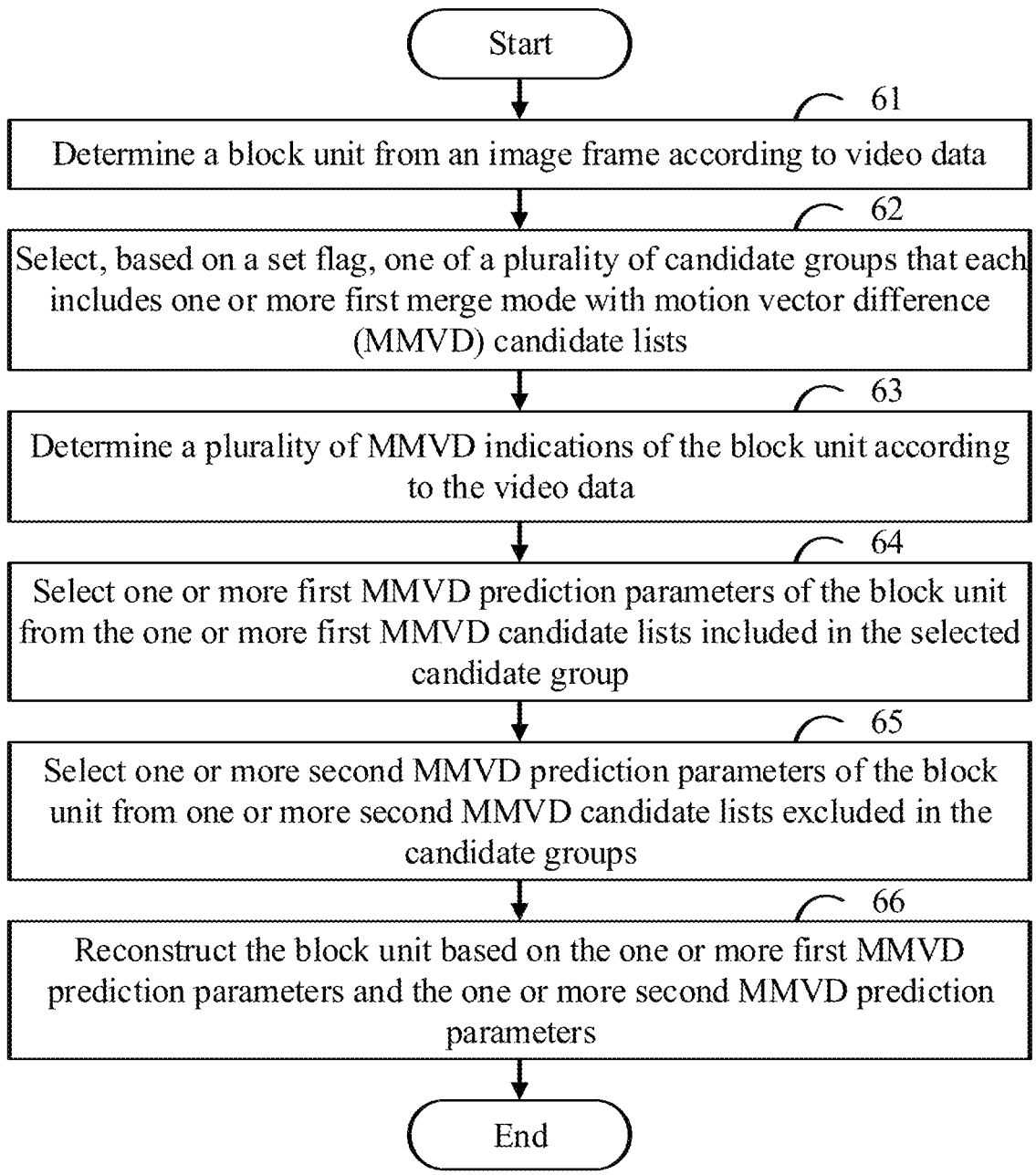
FIG. 6 illustrates a flowchart of an example reconstruction method for reconstructing a block unit based on a plurality of MMVD candidate parameters in a plurality of candidate groups, according to an example implementation of the present application.

FIG. 6 illustrates a flowchart of an example reconstruction method for reconstructing a block unit based on a plurality of merge mode with motion vector difference (MMVD) candidate parameters in a plurality of candidate groups, according to an example implementation of the present application. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 6 may represent one or more processes, methods, or subroutines, carried out in the example method. Furthermore, the order of blocks is illustrative only and may change. Additional blocks may be added or less blocks may be utilized without departing from the present disclosure.

At block 61, the decoder module 222 may determine a block unit from an image frame according to video data.

In at least one implementation, the video data may be a bitstream. In at least one implementation, the destination device 12 may receive the bitstream from an encoder, such as the source device 11, via the second interface 123 of the destination device 12. The second interface 123 may provide the bitstream to the decoder module 222. The decoder module 222 may determine the image frame based on the bitstream and divide the image frame to determine the block unit according to a plurality of partition indications in the bitstream. For example, the decoder module 222 may divide the image frames to generate a plurality of coding tree units, and further divide one of the coding tree units to determine the block unit according to the partition indications based on a video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 62, the prediction process unit 2222 may select, based on a set flag, one of a plurality of candidate groups that each may include one or more first merge mode with motion vector difference (MMVD) candidate lists.

In at least one implementation, there may be a plurality of motion parameters for predicting the block unit when the block unit is predicted in the MMVD mode. In at least one implementation, the motion parameters may include a base motion, a motion difference, and a prediction direction. In at least one implementation, each of the motion parameters may include a plurality of candidate parameters. In at least one implementation, the decoder module 222 may select a prediction parameter from the candidate parameter for each of the motion parameters. For example, one of the prediction parameters may be selected from the candidate parameters of the base motion.

In at least one implementation, the inter prediction unit 22222 may generate the plurality of base candidates for the block unit based on the neighbor motion information. In at least one implementation, the base candidates are the candidate parameters for selecting the base motion. Each of the base candidates includes at least one frame candidate and at least one vector candidate.

In at least one implementation, the motion difference may further include a difference magnitude and a difference direction. In at least one implementation, the inter prediction unit 22222 may select one of the base candidates and determine the motion difference to adjust the vector candidate in the selected base candidate. In at least one implementation, a plurality of difference distance candidates are the candidate parameters for selecting the difference magnitude, and a plurality of difference direction candidates are the candidate parameters for selecting the difference direction.

In at least one implementation, the inter prediction unit 22222 may select at least one of the first reference list L0 and the second reference list L1 from a plurality of prediction direction candidates for predicting the block unit. When the block unit is predicted based on one of the first frame candidates in the first reference list L0 and one of the second frame candidates in the second reference list L1, the block unit is a bi-predicted block predicted based on the first reference list L0 and the second reference list L1.

In at least one implementation, the candidate parameters corresponding to at least one of the motion parameters may be classified into the candidate groups. In the implementation, other motion parameters may not be included in the candidate groups. In at least one implementation, each of the candidate groups may include one or more first MMVD candidate lists each of which has a plurality of first MMVD candidate parameters. In the implementation, the first MMVD candidate parameters may be the candidate parameters in the at least one classified motion parameters. In at least one implementation, the number of the at least one classified motion parameter may be equal to the number of the one or more first MMVD candidate lists in each of the candidate groups. For example, the difference distance candidates and the difference direction candidates may be classified into the candidate groups. In the implementation, the base candidates and the prediction direction candidates may not be included in the candidate groups. Thus, the at least one classified motion parameter is the difference magnitude and the difference direction, and the number of the at least one classified motion parameter may be equal to two. In addition, the number of the one or more first MMVD candidate lists in each of the candidate groups may be equal to two. In the implementation, one of the two first MMVD candidate lists in each of the candidate groups may include the difference distance candidates, and the other of the first MMVD candidate lists in each of the candidate groups may include the difference direction candidates. In at least one implementation, the difference distance candidates may be classified into the candidate groups. In the implementation, the base candidates, the difference direction candidates, and the prediction direction candidates may not be included in the candidate groups. Thus, the at least one classified motion parameter is the difference magnitude, and the number of the at least one classified motion parameter may be equal to one. In addition, the number of the one or more first MMVD candidate lists in each of the candidate groups may be equal to one. In the implementation, the first MMVD candidate list in each of the candidate groups may include the difference distance candidates.

In at least one implementation, a distribution of the candidate parameters in the candidate groups may be predefined (e.g., in the encoder module 112 and the decoder module 222). Thus, the inter prediction unit 22222 may directly determine a classified result of the first MMVD candidate parameters in the candidate groups from the decoder module 222. In at least one implementation, the inter prediction unit 22222 may directly determine the candidate groups that include the first MMVD candidate parameters. In the implementation, the first MMVD candidate parameters in each of the candidate groups may be predefined in the decoder module 222.

In at least one implementation, the prediction indications may include the set flag indicating whether at least one of the prediction parameters of the block unit is selected from a specific one of the candidate groups. Thus, the inter prediction unit 22222 may directly select the at least one of the prediction parameters of the block unit from the specific candidate group, when the set flag is equal to one. In addition, the inter prediction unit 22222 may directly determine that the at least one of the prediction parameters of the block unit is not selected from the specific candidate group, when the set flag is equal to zero. In at least one implementation, the set flag may be an fpel_mmvd_enable_flag to indicate whether the at least one of the prediction parameters of the block unit is selected from the specific candidate group. In at least one implementation, the set flag may be a slice_fpel_mmvd_enabled_flag, when the set flag is included in a slice header.

Referring back to FIG. 6, at block 63, the prediction process unit 2222 may determine a plurality of MMVD indications of the block unit according to the video data.

In at least one implementation, the prediction indications may include the MMVD indications indicating a base candidate index, a motion difference indication, and a prediction direction index for the MMVD mode. In at least one implementation, the MMVD indications may include at least one of the base candidate index, the motion difference indication, and the prediction direction index. In at least one implementation, the decoder module 222 may select one of the prediction parameters from the candidate parameters for each of the motion parameters based on a corresponding one of the MMVD indications. For example, one of the prediction parameters may be selected from the candidate parameters of the base motion based on the base candidate index.

In at least one implementation, the base candidate index may be an MMVD flag mmvd_cand_flag indicating the selected base candidate included in the prediction parameters. In one implementation, the base motion of the block unit may indicate the first frame candidate in the first reference list L0, the first vector candidate corresponding to the first frame candidate, the second frame candidate in the second reference list L1, and the second vector candidate corresponding to the second frame candidate, when the base motion of the block unit is the bi-predictive candidate selected from the base candidates based on the base candidate index.

In at least one implementation, the motion difference indication may further include a motion distance index, and a motion direction index. In at least one implementation, the motion distance index may be a first MMVD index mmvd_distance_idx indicating the difference magnitude from the difference distance candidates, and the motion direction index may be a second MMVD index mmvd_direction_idx indicating the difference direction from the difference direction candidates. In at least one implementation, the motion difference indication may be a motion difference index indicating the motion difference including an x-coordinate difference and a y-coordinate difference. Thus, the inter prediction unit 22222 may determine the motion difference based on the x-coordinate difference and the y-coordinate difference indicated by the motion difference index to adjust the selected vector candidate.

In at least one implementation, the inter prediction unit 22222 may select the at least one of the first reference list L0 and the second reference list L1 from a plurality of prediction direction candidates based on the prediction direction index. In at least one implementation, there may be no prediction direction index in the prediction indications, when the reference list determined by the base candidate index is preset as the selected reference list for predicting the block unit.

In at least one implementation, the MMVD indications may include a set index. In the implementation, the set index may indicate at least one of the base candidate index, the motion difference index, and the prediction direction index, when the motion difference indication is the motion difference index. In the implementation, the at least one indicated index selected from the base candidate index, the motion difference index, and the prediction direction index may not be included in the MMVD indications, and the other indices unindicated in the set index and selected from the base candidate index, the motion difference index, and the prediction direction index may be directly included in the MMVD indications. In at least one implementation, the set index may indicate at least one of the base candidate index, the motion distance index, the motion direction index, and the prediction direction index, when the motion difference indication includes the motion distance index and the motion direction index. In the implementation, the at least one indicated index selected from the base candidate index, the motion distance index, the motion direction index, and the prediction direction index may not be included in the MMVD indications, and the other indices unindicated in the set index and selected from the base candidate index, the motion distance index, the motion direction index, and the prediction direction index may be directly included in the MMVD indications. For example, the decoder module 222 may directly determine the difference magnitude based on the set index, when the set index only represents the motion distance index. In the implementation, the difference distance candidates may be distributed in the candidate groups, when the set index represents the motion distance index. In the implementation, the base candidates, the difference direction candidates, and the prediction direction candidates are not included in the candidate groups. In addition, the base candidate index, the motion direction index, and the prediction direction index directly included in the MMVD indications may not be indicated by the set index.

At block 64, the decoder module 222 may select one or more first MMVD prediction parameters of the block unit from the one or more first MMVD candidate lists included in the selected candidate group.

In at least one implementation, the one or more first MMVD prediction parameters are included in the prediction parameters of the block unit. In at least one implementation, the inter prediction unit 22222 may directly determine the one or more first MMVD prediction parameters from the specific candidate group based on the set index. In at least one implementation, the inter prediction unit 22222 may select the one or more first MMVD prediction parameters from the one or more first MMVD candidate lists in the selected candidate group.

In at least one implementation, the number of the one or more first MMVD candidate lists in the selected candidate group may be equal to one, when the number of the at least one classified motion parameters is equal to one. Thus, the inter prediction unit 22222 may select one first MMVD prediction parameter correspond to one classified motion parameter from one first MMVD candidate list in the selected candidate group. For example, the one classified motion parameter corresponding to the one first MMVD prediction parameter is the difference magnitude of the block unit. Thus, the one first MMVD candidate list may only include the difference distance candidates. In the implementation, the inter prediction unit 22222 may select the difference magnitude of the block unit from the difference distance candidates in the one first MMVD candidate list of the selected candidate groups based on the set index.

In at least one implementation, the number of the one or more first MMVD candidate lists in the selected candidate group may be greater than one, when the number of the at least one classified motion parameters is greater than one. Thus, the inter prediction unit 22222 may select the first MMVD prediction parameters each of which may correspond to one of the classified motion parameters from the first MMVD candidate lists in the selected candidate group. In at least one implementation, the inter prediction unit 22222 may select each of the first MMVD prediction parameters from the first MMVD candidate parameters in a corresponding one of the first MMVD candidate lists of the selected candidate group, since each of the classified motion parameters corresponds to one of the first MMVD candidate lists in the selected candidate group.

At block 65, the decoder module 222 may select one or more second MMVD prediction parameters of the block unit the one or more second MMVD candidate lists excluded in the candidate groups.

In at least one implementation, the one or more second MMVD prediction parameters are included in the prediction parameters of the block unit. In at least one implementation, the candidate parameters in at least one unclassified motion parameters may be included in the one or more second MMVD candidate lists excluded in the candidate groups, since the at least one unclassified motion parameters are excluded in the candidate groups. In the implementation, each of the one or more second MMVD candidate lists is different from the one or more first MMVD candidate lists. In at least one implementation, the candidate parameters in each of the at least one unclassified motion parameters may be included in a corresponding one of the one or more second MMVD candidate lists. For example, the base candidates may be included in one of two second MMVD candidate lists and the difference direction candidates may be included in the other of the two second MMVD candidate lists, when the at least one unclassified motion parameter is the base motion and the difference direction.

In at least one implementation, the inter prediction unit 22222 may determine the one or more second MMVD prediction parameters each of which may correspond to at least one unclassified motion parameter based on one or more of the MMVD indications. In at least one implementation, each of the one or more of the MMVD indications is different from the set index. In at least one implementation, the inter prediction unit 22222 may select each of the one or more second MMVD prediction parameters from the second MMVD candidate parameters in a corresponding one of the one or more second MMVD candidate lists based on a corresponding one of the one or more of the MMVD indications. For example, the base motion of the block unit may be determined based on the base candidate index and the difference magnitude of the block unit may be determined based on the motion distance index, when the at least one unclassified motion parameters is the base motion and the difference direction.

At block 66, the decoder module 222 may reconstruct the block unit based on the one or more first prediction parameters and the one or more second prediction parameters.

In at least one implementation, the inter prediction unit 22222 may generate a predicted component for one of the block components in the block unit according to the one or more first prediction parameters and the one or more second prediction parameters. In at least one implementation, the first summer 2224 may generate a plurality of reconstructed components based on the predicted components and a plurality of residual components for reconstructing the block unit. In the implementation, the first summer 2224 may receive the residual components of the block unit via the entropy decoding unit 2221 and the inverse quantization/inverse transform unit 2223. In the implementation, the residual components may be determined from the bitstream. In at least one implementation, the decoder module 222 may reconstruct all of the other block units in the image frame for reconstructing the image frame and the video.

Figure 7:
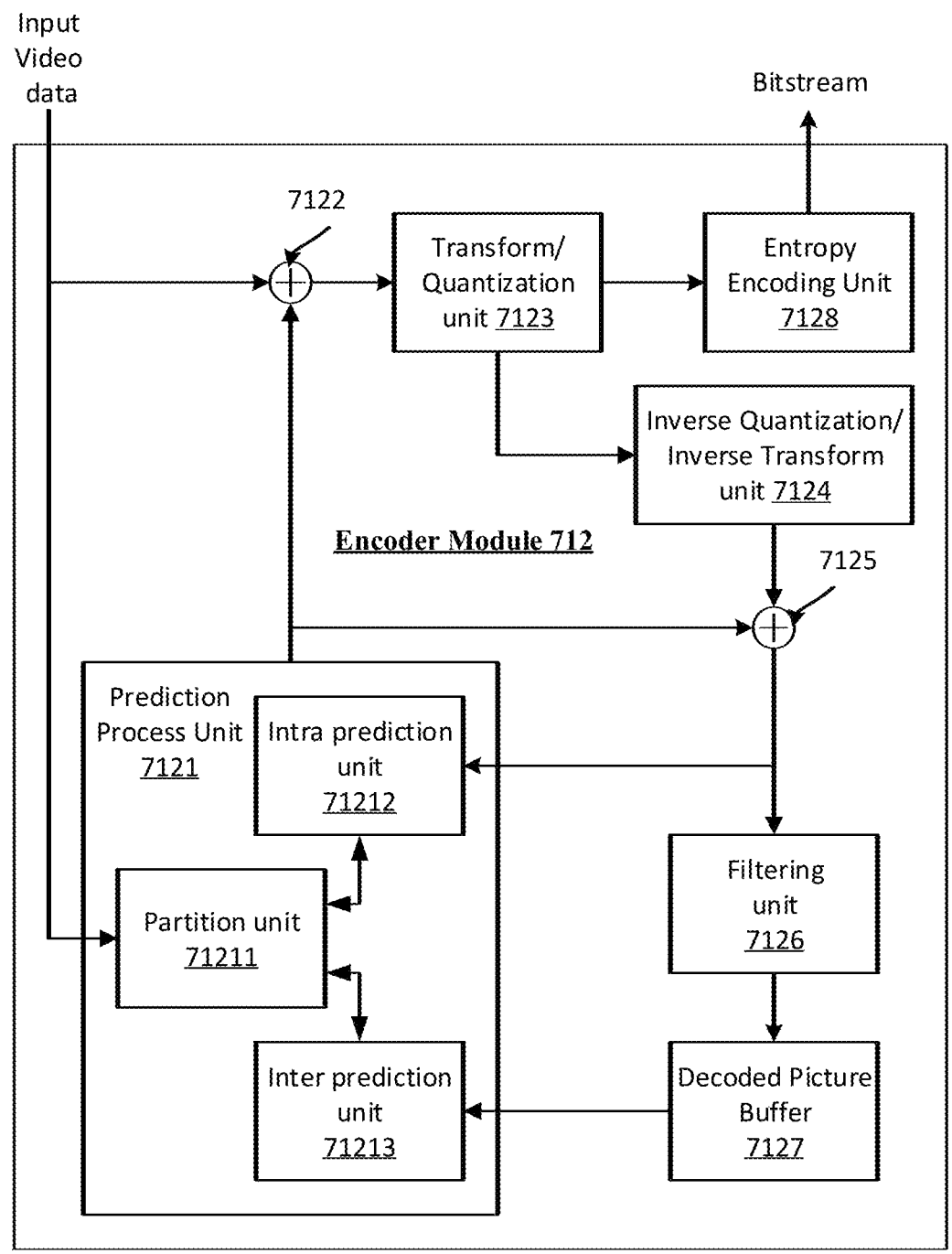
FIG. 7 is a block diagram of an example encoder module of the source device in the system of FIG. 1, according to an example implementation of the present application.

FIG. 7 is a block diagram of an encoder module 712 representing an example implementation of the encoder module 112 of the source device 11 in the system of FIG. 1, according to an example implementation of the present application. In at least one implementation, the encoder module 712 may include a prediction processor (e.g., a prediction process unit 7121), at least one summer (e.g., a first summer 7122 and a second summer 7125), a quantization/inverse transform processor (e.g., a transform/quantization unit 7123), an inverse quantization/inverse transform processor (e.g., an inverse quantization/inverse transform unit 7124), a filter (e.g., a filtering unit 7126), a decoded picture buffer (e.g., a decoded picture buffer 7127), and an entropy encoder (e.g., an entropy encoding unit 7128). In at least one implementation, the prediction process unit 7121 of the encoder module 712 may further include a partition processor (e.g., a partition unit 71211), an intra prediction processor (e.g., an intra prediction unit 71212), and an inter prediction processor (e.g., an inter prediction unit 71213). In at least one implementation, the encoder module 712 may receive the source video and encode the source video to output a bitstream.

In at least one implementation, the encoder module 712 may receive a source video including a plurality of image frames and then divide the image frames according to a coding structure. In at least one implementation, each of the image frames may be divided into at least one image block. The at least one image block may include a luminance block having a plurality of luminance samples, and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit. In at least one implementation, the encoder module 712 may perform additional sub-divisions of the source video. It should be noted that the present implementations described herein are generally applicable to video coding, regardless of how the source video is partitioned prior to, and/or during, the encoding.

In at least one implementation, during the encoding process, the prediction process unit 7121 may receive a current image block of a specific one of the image frames. The current image block may be one of the luminance block and the at least one of the chrominance block in the specific image frame. The partition unit 71211 may divide the current image block into multiple block units. The intra prediction unit 71212 may perform intra-predictive coding of a current block unit relative to one or more neighboring blocks in the same frame as the current block unit to provide spatial prediction. The inter prediction unit 71213 may perform inter-predictive coding of the current block unit relative to one or more blocks in one or more reference image blocks to provide temporal prediction.

In at least one implementation, the prediction process unit 7121 may select one of the coding results generated by the intra prediction unit 71212 and the inter prediction unit 71213 based on a mode selection method, such as a cost function. In at least one implementation, the mode selection method may be a rate-distortion optimization (RDO) process. The prediction process unit 7121 may determine the selected coding result, and provide a predicted block corresponding to the selected coding result to the first summer 7122 for generating a residual block and to the second summer 7125 for reconstructing the encoded block unit. In at least one implementation, the prediction process unit 7121 may further provide syntax elements, such as motion vectors, intra-mode indicators, partition information, and other syntax information, to the entropy encoding unit 7128.

In at least one implementation, the intra prediction unit 71212 may intra-predict the current block unit. In at least one implementation, the intra prediction unit 71212 may determine an intra-prediction mode directing toward reconstructed sample neighboring the current block unit to encode the current block unit. In at least one implementation, the intra prediction unit 71212 may encode the current block unit using various intra-prediction modes, and the intra prediction unit 71212 or the prediction process unit 7121 may select an appropriate intra-prediction mode from the tested modes. In at least one implementation, the intra prediction unit 71212 may encode the current block unit using a cross component prediction mode to predict one of the two chroma components of the current block unit based on the luma components of the current block unit. In addition, the intra prediction unit 71212 may predict a first one of the two chroma components of the current block unit based on the other of the two chroma components of the current block unit.

In at least one implementation, the inter prediction unit 71213 may inter-predict the current block unit as an alternative to the intra-prediction performed by the intra prediction unit 71212, as described above. The inter prediction unit 71213 may perform a motion estimation to estimate a motion of the current block unit for generating a motion vector. The motion vector may indicate a displacement of the current block unit within the current image block relative to a reference block unit within a reference image block. In at least one implementation, the inter prediction unit 71213 may receive at least one reference image block stored in the decoded picture buffer 7127 and estimate the motion based on the received reference image blocks to generate the motion vector.

In at least one implementation, the first summer 7122 may generate the residual block by subtracting the prediction block determined by the prediction process unit 7121 from the original current block unit. The first summer 7122 may represent the component or components that perform this subtraction operation.

In at least one implementation, the transform/quantization unit 7123 may apply a transform to the residual block to generate a residual transform coefficient, and then may quantize the residual transform coefficients to further reduce bit rate. In at least one implementation, the transform may be one of a DCT, DST, AMT, MDNSST, HyGT, signal dependent transform, KLT, wavelet transform, integer transform, sub-band transform or a conceptually similar transform. In at least one implementation, the transform may convert the residual information from a pixel value domain to a transform domain, such as a frequency domain. In at least one implementation, the degree of quantization may be modified by adjusting a quantization parameter. In at least one implementation, the transform/quantization unit 7123 may perform a scan of the matrix including the quantized transform coefficients. Alternatively, the entropy encoding unit 7128 may perform the scan.

In at least one implementation, the entropy encoding unit 7128 may receive a plurality of syntax elements including quantization parameter, transform data, motion vectors, intra modes, partition information, and other syntax information, from the prediction process unit 7121 and the transform/quantization unit 7123, and may encode the syntax elements into the bitstream. In at least one implementation, the entropy encoding unit 7128 may entropy encode the quantized transform coefficients. In at least one implementation, the entropy encoding unit 7128 may perform CAVLC, CABAC, SBAC, PIPE coding or another entropy coding technique to generate an encoded bitstream. In at least one implementation, the encoded bitstream may be transmitted to another device (e.g., the destination device 12) or archived for later transmission or retrieval.

In at least one implementation, the inverse quantization/inverse transform unit 7124 may apply inverse quantization and inverse transformation to reconstruct the residual block in the pixel domain for later use as a reference block. In at least one implementation, the second summer 7125 may add the reconstructed residual block to the prediction block provided from the prediction process unit 7121 to produce a reconstructed block for storage in the decoded picture buffer 7127.

In at least one implementation, the filtering unit 7126 may include a deblocking filter, a SAO filter, a bilateral filter, and/or an ALF to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the second summer 7125.

In at least one implementation, the decoded picture buffer 7127 may be a reference picture memory that stores the reference block for use in encoding video by the encoder module 712, e.g., in intra- or inter-coding modes. The decoded picture buffer 7127 may be formed by any of a variety of memory devices, such as DRAM, including SDRAM, MRAM, RRAM), or other types of memory devices. In at least one implementation, the decoded picture buffer 7127 may be on-chip with other components of the encoder module 712, or off-chip relative to those components.

In at least one implementation, the encoder module 712 may perform the prediction method for predicting a block unit based on a plurality of merge mode with motion vector difference (MMVD) candidate parameters in a plurality of candidate groups as shown in FIG. 3. The method in FIG. 3 may be carried out using the configurations illustrated in FIG. 1 and FIG. 7, for example, and various elements of these figures are referenced in explaining the example method. Furthermore, the order of blocks in FIG. 3 is illustrative only and may change. Additional blocks may be added or less blocks may be utilized without departing from this disclosure.

At block 31, the encoder module 712 may determine a block unit from an image frame according to video data and determines a plurality of candidate parameters for the block unit.

In at least one implementation, the video data may be a video. The source device 11 may receive the video by the source module 111. The encoder module 712 may determine the image frame from the video and divide the image frame to determine the block unit.

In at least one implementation, the prediction process unit 7121 of the source device 11 may determine the block unit from the video via the partition unit 71211, and then the encoder module 712 may provide a plurality of partition indications into a bitstream based on a partition result of the partition unit 71211.

In at least one implementation, the source device 11 may determine the candidate parameters of a merge mode with motion vector difference (MMVD) mode selected from a plurality of candidate modes for the block unit and select a plurality of prediction parameters from the candidate parameters to predict the block unit. In the implementation, the source device 11 may provide a plurality of prediction indications indicating the prediction parameters of the block unit in the bitstream to the destination device 12. In at least one implementation, the prediction indications may include a plurality of flags and a plurality of indices.

In at least one implementation, the MMVD mode may include a plurality of motion parameters. In at least one implementation, the motion parameters may include a base motion, a motion difference, and a prediction direction. In at least one implementation, each of the motion parameters may include the candidate parameters. In at least one implementation, the prediction indications may include at least one of a base candidate index, a motion difference indication, and a prediction direction index for the MMVD mode. In at least one implementation, the prediction indication may be provided into the bitstream for each of the motion parameters. For example, the base candidate index may be provided into the bitstream for the base motion.

In at least one implementation, the set index may represent at least one of the base candidate index, the motion distance index, the motion direction index, and the prediction direction index, when the motion difference indication includes the motion distance index and the motion direction index. For example, the encoder module 712 may provide the set index into the bitstream to indicate the difference magnitude, when the set index only represents the motion distance index.

At block 32, the encoder module 712 may determine a plurality of candidate groups that each includes a plurality of group parameters selected from the candidate parameters.

In at least one implementation, the inter prediction unit 71213 may determine a plurality of previous blocks encoded prior to the block unit. In the implementation, the previous blocks are predicted by a plurality of previous modes selected from the candidate modes. In at least one implementation, the previous modes may include a plurality of previous parameters selected from the candidate parameters, when the previous modes are the MMVD mode. Thus, the inter prediction unit 71213 may determine the previous parameters of the previous blocks and classify the candidate parameters identical to or similar to the previous parameters of the prediction modes into a first candidate group. For example, the inter prediction unit 71213 compares the difference distance candidates in the candidate parameters with the difference magnitudes of the previous modes of the previous blocks, when the inter prediction unit 71213 uses the set index to represent the difference magnitudes.

In at least one implementation, a distribution of the candidate parameters in the candidate groups may be predefined (e.g., in the encoder module 712 and the decoder module 122). Thus, the inter prediction unit 71213 may directly determine a classified result of the candidate parameters in the candidate groups from the encoder module 712. In the implementation, the candidate parameters in each of the candidate groups may be predefined in the encoder module 712.

At block 33, the encoder module 712 may determine whether a specific one of the candidate parameters for predicting the block unit is included in the first candidate group. If the specific candidate parameter of the block unit is included in the first candidate group, the procedure may proceed to block 34. If the specific candidate parameter of the block unit is not included in the first candidate group, the procedure may proceed to block 35.

In at least one implementation, the encoder module 712 may determine whether the specific prediction candidate of the block unit is included in the first candidate group, when the block unit is predicted in the MMVD mode. When the encoder module 712 determines that the specific prediction candidate of the block unit is included in the first candidate group, the encoder module 712 may provide a set flag equal to one into the bitstream. When the encoder module 712 determines that the specific prediction candidate of the block unit is not included in the first candidate group, the encoder module 712 may provide the set flag equal to zero into the bitstream. In at least one implementation, the set flag may be an fpel_mmvd_enable_flag to indicate whether the specific candidate parameter of the block unit is included in the first candidate group. In at least one implementation, the set flag may be a slice_fpel_mmvd_enabled_flag, when the set flag is included in a slice header.

At block 34, the encoder module 712 may determine the prediction parameters based on the specific candidate parameter corresponding to the set index.

In at least one implementation, each of the group candidates in the first candidate group may correspond to one index value of the set index. Thus, the inter prediction unit 71213 may determine the index value corresponding to the specific candidate parameter and provide the set index into the bitstream, when the specific prediction candidate is included in the first candidate group.

At block 35, the encoder module 712 may determine the prediction parameters based on the specific candidate parameter in the remaining candidate groups.

In at least one implementation, each of the prediction candidates in the remaining candidate groups corresponds to one index value of a group index. Thus, the inter prediction unit 91213 may determine the index value corresponding to the specific candidate parameter and provide the group index into the bitstream, when the specific prediction candidate is not included in the first candidate group.

At block 36, the encoder module 712 may reconstruct the block unit based on the determined prediction parameters.

In at least one implementation, the inter prediction unit 71213 can generate a predicted component for one of the block components in the block unit according to the determined prediction parameters. In at least one implementation, the first summer 7122 can generate a plurality of residual components based on the predicted components and a plurality of original components for predicting the image frame. In the implementation, the original components are directly determined from the image frame of the video. In the implementation, the transform/quantization unit 9123 and the entropy encoding unit 9128 can encode the residual components to provide a bitstream to the destination device 12. In addition, the second summer 9125 can further reconstruct the block unit based on the residual components and the predicted components to generate a plurality of reconstructed components. Thus, the reconstructed components of the block unit can be a reference block for predicting a next block unit.

Figure 8:
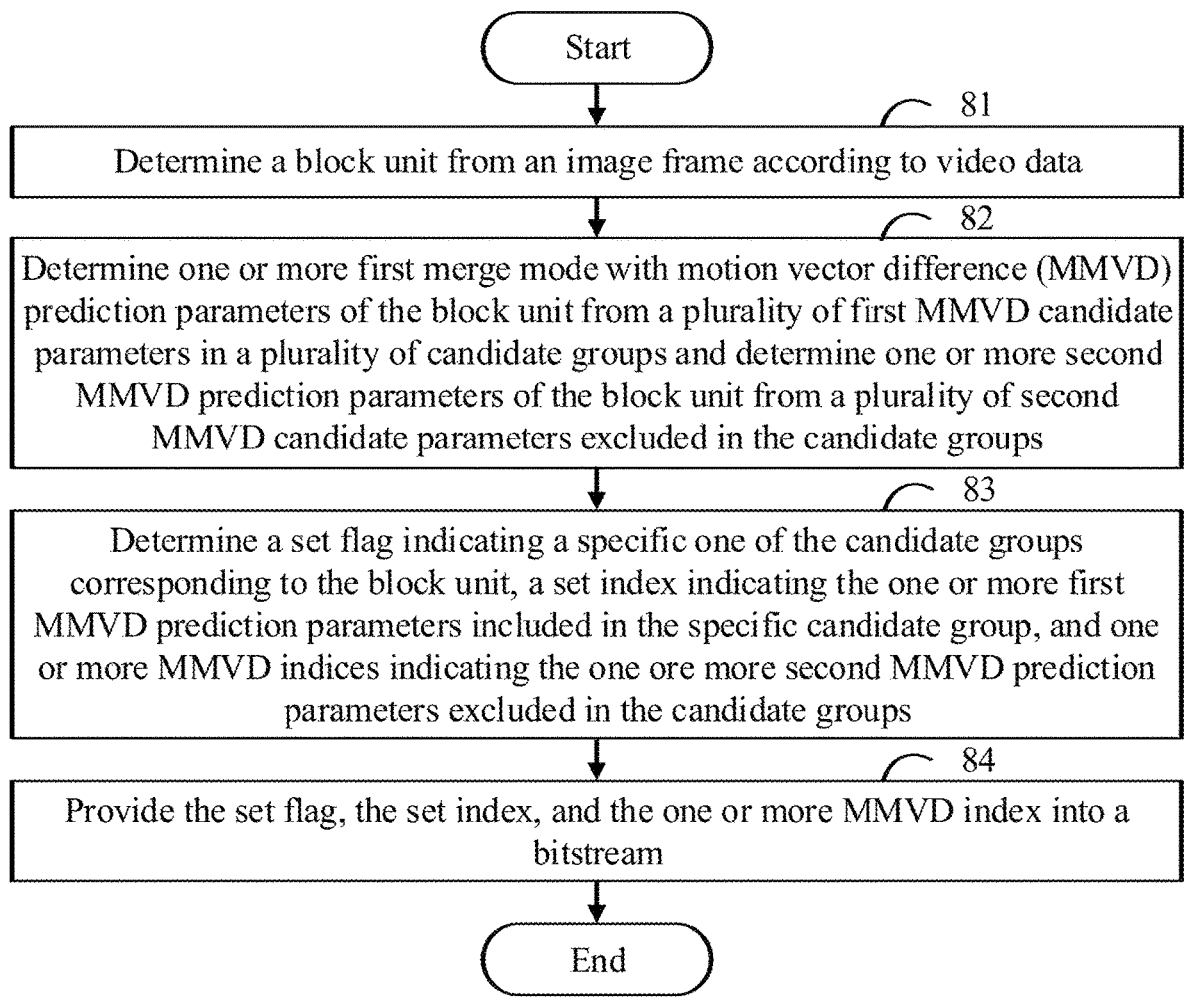
FIG. 8 illustrates a flowchart of an example prediction method for predicting a block unit based on a plurality of MMVD candidate parameters in a plurality of candidate groups, according to an example implementation of the present application.

FIG. 8 illustrates a flowchart of an example prediction method for predicting a block unit based on a plurality of merge mode with motion vector difference (MMVD) candidate parameters in a plurality of candidate groups, according to an example implementation of the present application. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 8 may represent one or more processes, methods, or sub-routines, carried out in the example method. Furthermore, the order of blocks is illustrative only and may change. Additional blocks may be added or less blocks may be utilized without departing from the present disclosure.

At block 81, the encoder module 712 may determine a block unit from an image frame according to video data.

In at least one implementation, the video data may be a video. The source device 11 may receive the video by the source module 111. The encoder module 712 may determine the image frame from the video and divide the image frame to determine the block unit. In at least one implementation, the prediction process unit 7121 of the source device 11 may determine the block unit from the video via the partition unit 71211, and then the encoder module 712 may provide a plurality of partition indications into a bitstream based on a partition result of the partition unit 71211.

At block 82, the encoder module 712 may determine one or more first merge mode with motion vector difference (MMVD) prediction parameters of the block unit from a plurality of first MMVD candidate parameters in a plurality of candidate groups and determines one or more second MMVD prediction parameters of the block unit from a plurality of second MMVD candidate parameters excluded in the candidate groups.

In at least one implementation, the encoder module 712 may determine a plurality of MMVD candidate parameters and select a plurality of MMVD prediction parameters from the MMVD candidate parameters, when the block unit is predicted in an MMVD mode selected from a plurality of candidate modes.

In at least one implementation, the MMVD mode may include a plurality of motion parameters. In at least one implementation, the motion parameters may include a base motion, a motion difference, and a prediction direction. In at least one implementation, the motion parameters may include the base motion, a difference magnitude, a difference direction, and the prediction direction. In at least one implementation, each of the motion parameters may include the MMVD candidate parameters.

In at least one implementation, the MMVD candidate parameters may include the first MMVD candidate parameters and the second MMVD candidate parameters, and the motion parameters may be separated into one or more first motion parameters and one or more second motion parameters. In at least one implementation, the first MMVD candidate parameters for selecting the one or more first MMVD prediction parameters may be the MMVD candidate parameters corresponding to the one or more first motion parameters and distributed in the candidate groups, and the second MMVD candidate parameters for selecting the one or more second MMVD prediction parameters may be the MMVD candidate parameters corresponding to the one or more second motion parameters and excluded in the candidate groups. In at least one implementation, each of the candidate groups may include the first MMVD candidate parameters corresponding to each of the one or more first motion parameters. For example, the one or more first motion parameters are the difference magnitude and the difference directions. In the implementation, each of the candidate groups may include the first MMVD candidate parameters of the difference magnitude and the first MMVD candidate parameters of the difference direction. For example, the one or more first motion parameters are the difference magnitude. In the implementation, each of the candidate groups may include the first MMVD candidate parameters of the difference magnitude.

In at least one implementation, a distribution of the first MMVD candidate parameters in the candidate groups may be predefined in the encoder module 712 and the decoder module 122. Thus, the inter prediction unit 71213 may directly determine a predefined distribution of the first MMVD candidate parameters in the candidate groups.

At block 83, the encoder module 712 may determine a set flag indicating a specific one of the candidate groups corresponding to the block unit, a set index indicating the one or more first MMVD prediction parameters included in the specific candidate group, and one or more MMVD index indicating the one or more second MMVD prediction parameters excluded in the candidate groups.

In the implementation, the encoder module 712 may provide a plurality of prediction indications indicating the MMVD prediction parameters of the block unit to the destination device 12. In at least one implementation, the prediction indications may include a plurality of flags and a plurality of indices. In at least one implementation, the prediction indications may include at least one of a base candidate index, a motion difference indication, and a prediction direction index for the MMVD mode for indicating the motion parameters.

In at least one implementation, the set index may represent at least one of the base candidate index, the motion distance index, the motion direction index, and the prediction direction index, when the motion difference indication includes the motion distance index and the motion direction index. For example, the encoder module 712 may provide the set index to indicate the difference magnitude, when the set index only represents the motion distance index.

In at least one implementation, the encoder module 712 may determine whether the one or more first MMVD prediction parameters of the block unit are included in a first one of candidate groups. When the encoder module 712 determines that the one or more first MMVD prediction parameters of the block unit are included in the first candidate group, the encoder module 712 may provide the set flag equal to one. When the encoder module 712 determines that the one or more first MMVD prediction parameters of the block unit are not included in the first candidate group, the encoder module 712 may provide the set flag equal to zero. In at least one implementation, the set flag may be an fpel_mmvd_enable_flag to indicate whether the one or more first MMVD prediction parameters of the block unit is included in the first candidate group. In at least one implementation, the set flag may be a slice_fpel_mmvd_enabled_flag, when the set flag is included in a slice header.

In at least one implementation, each of the first MMVD candidate parameters in the candidate groups corresponds to one of a plurality of first index values for the set index. Thus, the encoder module 712 may determine a specific one of the first index values corresponding to the one or more first MMVD prediction parameters for the set index. In at least one implementation, each of the second MMVD candidate parameters corresponds to one of a plurality of second index values for a corresponding one of the one or more MMVD indices. Thus, the inter prediction unit 91213 may determine a specific one of the second index values corresponding to a specific one of the one or more first MMVD prediction parameters for the corresponding one of the one or more MMVD indices.

At block 84, the encoder module 712 may provide the set flag, the set index, and the one or more MMVD index into the bitstream.

In at least one implementation, the inter prediction unit 71213 can generate a predicted component for one of the block components in the block unit according to the one or more first MMVD prediction parameters and the one or more second MMVD prediction parameters. In at least one implementation, the first summer 7122 can generate a plurality of residual components based on the predicted components and a plurality of original components for predicting the image frame. In the implementation, the original components are directly determined from the image frame of the video. In the implementation, the transform/quantization unit 9123 and the entropy encoding unit 9128 can encode the residual components. In at least one implementation, the encoded residual components, the set flag, the set index, and the one or more MMVD index may be provided into the bitstream to the destination device 12.

From the above description, it is manifest that various techniques may be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of decoding a bitstream by an electronic device, the method comprising:
    determining a block unit from an image frame according to the bitstream;
    selecting, based on a set flag, one of a plurality of candidate groups;
    determining a plurality of merge mode with motion vector difference (MMVD) indications of the block unit according to the bitstream;
    selecting a plurality of MMVD prediction parameters of the block unit based on the plurality of MMVD indications and the selected one of the plurality of candidate groups; and
    reconstructing the block unit based on the plurality of MMVD prediction parameters,
    wherein:
    each of the plurality of candidate groups includes one or more first MMVD candidate lists each including a plurality of first MMVD candidate parameters;
    one or more of the plurality of MMVD prediction parameters are selected from the plurality of first MMVD candidate parameters in the one or more first MMVD candidate lists of the selected one of the plurality of candidate groups; and
    MMVD prediction parameters other than the one or more of the plurality of MMVD prediction parameters are selected from a plurality of second MMVD candidate parameters in one or more second MMVD candidate lists each of which is different from the one or more first MMVD candidate lists.

2. The method according to claim 1, wherein a base candidate index, a motion difference index, and a prediction direction index are determined from the plurality of MMVD indications.

3. The method according to claim 2, wherein a set index included in the plurality of MMVD indications indicates one or more of the base candidate index, the motion difference index, and the prediction direction index.

4. The method according to claim 3, wherein the set index is identical to one of the base candidate index, the motion difference index, and the prediction direction index for selecting one of the plurality of MMVD prediction parameters, when a number of the one or more of the base candidate index, the motion difference index, and the prediction direction index is equal to one.

5. An electronic device for decoding a bitstream, the electronic device comprising:
    at least one processor; and a storage device coupled to the at least one processor and storing a plurality of instructions which, when executed by the at least one processor, causes the at least one processor to:

determine a block unit from an image frame according to the bitstream;

select, based on a set flag, one of a plurality of candidate groups;

determine a plurality of merge mode with motion vector difference (MMVD) indications of the block unit according to the bitstream;

select a plurality of MMVD prediction parameters of the block unit based on the plurality of MMVD indications and the selected one of the plurality of candidate groups; and reconstruct the block unit based on the plurality of MMVD prediction parameters, wherein:

each of the plurality of candidate groups includes one or more first MMVD candidate lists each including a plurality of first MMVD candidate parameters;

one or more of the plurality of MMVD prediction parameters are selected from the plurality of first MMVD candidate parameters in the one or more first MMVD candidate lists of the selected one of the plurality of candidate groups; and MMVD prediction parameters other than the one or more of the plurality of MMVD prediction parameters are selected from a plurality of second MMVD candidate parameters in one or more second MMVD candidate lists excluded from the selected one of the plurality of candidate groups.

6. The electronic device according to claim 5, wherein a base candidate index, a motion difference index, and a prediction direction index are determined from the plurality of MMVD indications.

7. The electronic device according to claim 6, wherein a set index included in the plurality of MMVD indications indicates one or more of the base candidate index, the motion difference index, and the prediction direction index.

8. The electronic device according to claim 7, wherein the set index is identical to one of the base candidate index, the motion difference index, and the prediction direction index for selecting one of the plurality of MMVD prediction parameters, when a number of the one or more of the base candidate index, the motion difference index, and the prediction direction index is equal to one.

* * * * *